United States Patent
Rankenberg et al.

(10) Patent No.: US 10,590,838 B2
(45) Date of Patent: Mar. 17, 2020

(54) SUPERCHARGER AND INTERNAL COMBUSTION ENGINE

(71) Applicant: MITSUBISHI HEAVY INDUSTRIES ENGINE & TURBOCHARGER, LTD., Sagamihara-shi, Kanagawa (JP)

(72) Inventors: Mark Rankenberg, Almere (NL); Maik Schram, Almere (NL); Jochem Hooijer, Almere (NL); Rogier Schimmel, Almere (NL); Yosuke Dammoto, Sagamihara (JP); Motoki Ebisu, Sagamihara (JP); Toru Hoshi, Tokyo (JP)

(73) Assignee: MITSUBISHI HEAVY INDUSTRIES ENGINE & TURBOCHARGER, LTD., Sagamihara-shi (JP)

( * ) Notice: Subject to any disclaimer, the term of this patent is extended or adjusted under 35 U.S.C. 154(b) by 0 days.

(21) Appl. No.: 16/080,174

(22) PCT Filed: Feb. 28, 2017

(86) PCT No.: PCT/JP2017/007826
§ 371 (c)(1),
(2) Date: Aug. 27, 2018

(87) PCT Pub. No.: WO2017/150543
PCT Pub. Date: Sep. 8, 2017

(65) Prior Publication Data
US 2019/0048791 A1 Feb. 14, 2019

Related U.S. Application Data

(60) Provisional application No. 62/300,926, filed on Feb. 29, 2016.

(51) Int. Cl.
*F02B 37/18* (2006.01)
*F02B 37/22* (2006.01)
(Continued)

(52) U.S. Cl.
CPC ............ *F02B 37/183* (2013.01); *F02B 37/02* (2013.01); *F02B 37/22* (2013.01); *F02B 2037/122* (2013.01); *F05D 2220/40* (2013.01)

(58) Field of Classification Search
CPC ........ F02B 37/02; F02B 37/025; F02B 37/18; F02B 37/183; F02B 37/186; F02B 37/225;
(Continued)

(56) References Cited

U.S. PATENT DOCUMENTS 2,359,615 A * 10/1944 Browne ................ F02B 37/007
60/600
4,165,763 A * 8/1979 Hough .................. F16K 11/085
137/625.41

(Continued)

FOREIGN PATENT DOCUMENTS

DE 4325600 A1 2/1995
DE 10222917 A1 12/2003

(Continued)

OTHER PUBLICATIONS

Written Opinion of the International Searching Authority and International Search Report (forms PCT/ISA/237 and PCT/ISA/210), dated May 30, 2017, for International Application No. PCT/JP2017/007826 with English translations.

(Continued)

*Primary Examiner* — Mark A Laurenzi
*Assistant Examiner* — Mickey H France
(74) *Attorney, Agent, or Firm* — Birch, Stewart, Kolasch & Birch, LLP

(57) ABSTRACT

A supercharger includes a first introduction part having a first flow channel; a second introduction part having a second flow channel; a chamber into which the exhaust gas is introduced; an outlet part having one or a plurality of (Continued)

outlet flow channels; and a valve member housed in the chamber. The chamber has a first introduction port that leads to the first flow channel, a second introduction port that leads to the second flow channel, and one or a plurality of outlet ports that lead to the outlet flow channel. A main circulation space is secured. The valve member is capable of opening or closing, and allows two or more opened ports among the first introduction port, the second introduction port, and the outlet port to communicate with each other through the main circulation space.

8 Claims, 21 Drawing Sheets

(51) Int. Cl.
  *F02B 37/02* (2006.01)
  *F02B 37/12* (2006.01)
(58) Field of Classification Search
  CPC ............ F02B 2037/125; F01D 17/148; F05D 2220/40; F02D 9/16; F02D 9/1025; F02D 9/103
  USPC .......... 60/600, 601, 602, 603, 612; 123/528, 123/559.1, 562, 564
  See application file for complete search history.

(56) References Cited

U.S. PATENT DOCUMENTS

| | | | | |
|---|---|---|---|---|
| 4,502,282 | A * | 3/1985 | Kanesaka | F01D 17/146 60/602 |
| 4,526,004 | A * | 7/1985 | French | F02B 37/02 60/602 |
| 4,544,326 | A * | 10/1985 | Nishiguchi | F01D 9/026 415/151 |
| 5,943,864 | A * | 8/1999 | Sumser | F01D 17/148 60/602 |
| 6,089,019 | A * | 7/2000 | Roby | F02M 26/51 123/568.11 |
| 6,647,934 | B2 * | 11/2003 | Marsh | F01P 3/20 123/41.33 |
| 7,347,048 | B2 * | 3/2008 | Albat | F02B 37/005 137/625.47 |
| 8,096,754 | B2 * | 1/2012 | Naemura | F01D 17/105 415/144 |
| 8,316,642 | B2 | 11/2012 | McEwan et al. | |
| 9,856,787 | B2 * | 1/2018 | Chu | F02B 37/225 |
| 2004/0244373 | A1 * | 12/2004 | Frankenstein | F02B 37/025 60/602 |
| 2007/0137200 | A1 | 6/2007 | Rammer et al. | |
| 2009/0211246 | A1 * | 8/2009 | McEwan | F01N 11/002 60/602 |
| 2010/0037856 | A1 * | 2/2010 | Dickerson | F02B 37/02 123/323 |
| 2010/0065025 | A1 * | 3/2010 | Bucknell | F02B 29/0418 123/559.1 |
| 2010/0229550 | A1 | 9/2010 | Kuspert et al. | |
| 2011/0000208 | A1 * | 1/2011 | Robinson | F02B 37/001 60/602 |
| 2011/0123315 | A1 * | 5/2011 | Robinson | F02B 37/004 415/145 |
| 2011/0131975 | A1 * | 6/2011 | Styles | F02D 9/16 60/602 |
| 2012/0000438 | A1 * | 1/2012 | Sakagami | F02B 27/0263 123/184.47 |
| 2012/0085091 | A1 * | 4/2012 | Melchior | F01N 13/107 60/600 |
| 2014/0144134 | A1 * | 5/2014 | McEwan | F02B 37/183 60/602 |
| 2015/0337717 | A1 * | 11/2015 | Robinson | F02B 37/004 60/602 |
| 2016/0208680 | A1 * | 7/2016 | McConville | F02B 37/183 |
| 2017/0101925 | A1 * | 4/2017 | Robinson | F02B 37/183 |
| 2017/0370278 | A1 * | 12/2017 | McGahey | F02B 37/025 |
| 2018/0023460 | A1 * | 1/2018 | Mawer | F02B 37/183 251/304 |

FOREIGN PATENT DOCUMENTS

| | | |
|---|---|---|
| DE | 10 2004 034 070 A1 | 2/2006 |
| DE | 10 2006 058 102 A1 | 6/2008 |
| DE | 102013002894 A1 | 9/2014 |
| EP | 1 801 392 A2 | 6/2007 |
| GB | 2 312 930 A | 11/1997 |
| JP | 56-124358 U | 9/1981 |
| JP | 62-26529 U | 2/1987 |
| JP | 62-183034 U | 11/1987 |
| JP | 62-183035 U | 11/1987 |
| JP | 2-101037 U | 8/1990 |
| JP | 02286823 A * | 11/1990 |
| JP | 8-178093 A | 7/1996 |
| JP | 2008-506073 A | 2/2008 |
| JP | 2010-53788 A | 3/2010 |
| JP | 2012-202223 A | 10/2012 |
| WO | WO-2004053310 A1 * | 6/2004 ............ F02B 37/025 |

OTHER PUBLICATIONS

Japanese Office Action for counterpart Japanese Application No. 2018-503336, dated Jul. 23, 2019, with English translation.

\* cited by examiner

SUPERCHARGER AND INTERNAL COMBUSTION ENGINE

Priority is claimed on U.S. Patent Provisional Application No. 62/300,926, filed Feb. 29, 2016, the content of which is incorporated herein by reference.

TECHNICAL FIELD

The present invention relates to a supercharger and an internal combustion engine.

BACKGROUND ART

Turbochargers, which are superchargers that perform supercharging of an engine, drive a turbine utilizing exhaust gas. The turbochargers have a waste gate mechanism that detours the exhaust gas in order to prevent damage resulting from supercharging pressure becoming too high. The waste gate mechanism can cause the exhaust gas to flow to a system exterior without going through the turbine by opening the waste gate valve. Accordingly, the flow rate of the exhaust gas that flows into the turbine can be reduced in accordance with an opening degree of the waste gate valve (refer to Patent Document 1). As the waste gate mechanism, a flap-type waste gate valve is used in many cases.

CITATION LIST

Patent Literature

[Patent Document 1] German Patent Application, Publication No. 10 2013 002 894

SUMMARY OF INVENTION

Technical Problem

However, in the above-mentioned superchargers, improvements have been desired in respect of efficient utilization of the exhaust gas.

One aspect of the invention has been made in view of the above-described situation, and an object of the invention is to provide a supercharger and an internal combustion engine capable of efficiently utilizing exhaust gas.

Solution to Problem

One aspect of the invention provides a supercharger including a first introduction part having a first flow channel configured to direct exhaust gas from a first exhaust gas introduction passage that leads to a turbine driven by the exhaust gas; a second introduction part having a second flow channel configured to direct the exhaust gas from a second exhaust gas introduction passage that leads to the turbine; a chamber into which the exhaust gas is introduced through the first flow channel and the second flow channel; an outlet part having one or a plurality of outlet flow channels configured to direct the exhaust gas within the chamber to a system exterior; and a valve member housed in the chamber. The chamber has a first introduction port that leads to the first flow channel, a second introduction port that leads to the second flow channel, and one or a plurality of outlet ports that lead to the outlet flow channel. A main circulation space that allows gas to circulate thereinto is secured on a main surface side of the valve member within the chamber. The valve member is rotatable about an axis, is capable of opening or closing the first introduction port, the second introduction port, and the outlet port in accordance with a rotational position around the axis, and allows two or more opened ports among the first introduction port, the second introduction port, and the outlet port to communicate with each other through the main circulation space.

It is preferable that the valve member allows the first introduction port, and the second introduction port to communicate with each other through the main circulation space.

It is preferable that the valve member allows the first and second introduction ports and the outlet port to communicate with each other through the main circulation space.

It is preferable that the chamber has an inner peripheral surface that is a cylindrical surface having the axis as a central axis, the valve member has an outer peripheral surface, which is a columnar surface having the axis as a central axis, as a back surface opposite to the main surface, a cutout, which fours a subsidiary circulation space that allows gas to circulate thereinto, is formed in the outer peripheral surface of the valve member, and the cutout allows any one of the first and second introduction ports and the outlet port to communicate with each other through the subsidiary circulation space.

It is preferable that the valve member allows any one of the first and second introduction ports and the outlet port to communicate with each other through the main circulation spaces, and allows the other of the first and second introduction ports and the outlet port to communicate with each other through the subsidiary circulation space.

It is preferable that the plurality of outlet ports include a first outlet port and a second outlet port, and the valve member allows any one of the first and second introduction ports and the first outlet port to communicate with each other through the main circulation spaces, and allows the other of the first and second introduction ports and the second outlet port to communicate with each other through the subsidiary circulation space.

A guide protrusion, which is configured to adjust a flow resistance of gas flowing into the outlet port from at least one of the first and second introduction ports, may be formed on the main surface of the valve member.

An adjustment protrusion, which covers a portion of at least any one of the first and second introduction ports and thereby adjusts a flow rate of the gas from the port, may be formed on the main surface of the valve member.

One aspect of the invention provides an internal combustion engine including a first introduction part having a first flow channel that is configured to direct exhaust gas; a second introduction part having a second flow channel that is configured to direct the exhaust gas; a chamber into which the exhaust gas is introduced through the first flow channel and the second flow channel; an outlet part having one or a plurality of outlet flow channels that is configured to direct the exhaust gas within the chamber to a system exterior; and a valve member housed in the chamber. The chamber has a first introduction port that leads to the first flow channel, a second introduction port that leads to the second flow channel, and one or a plurality of outlet ports that lead to the outlet flow channel. A main circulation space that allows gas to circulate thereinto is secured on a main surface side of the valve member within the chamber. The valve member is rotatable about an axis, is capable of opening or closing the first introduction port, the second introduction port, and the outlet port in accordance with a rotational position around the axis, and allows two or more opened ports among the first introduction port, the second introduction port, and the outlet port to communicate with each other through the main circulation space.

Advantageous Effects of Invention

According to one aspect of the invention, exhaust gas can be efficiently utilized.

DESCRIPTION OF EMBODIMENTS

First Embodiment

Superchargers of embodiments are mounted on, for example, vehicles, such as automobiles having a reciprocating engine (hereinafter simply referred to as an engine) serving as an internal combustion engine as a drive source. The superchargers are so-called turbochargers that compress intake air utilizing exhaust gas of the engine. The engine has one or a plurality of (for example, four) cylinders.

Figure 1:
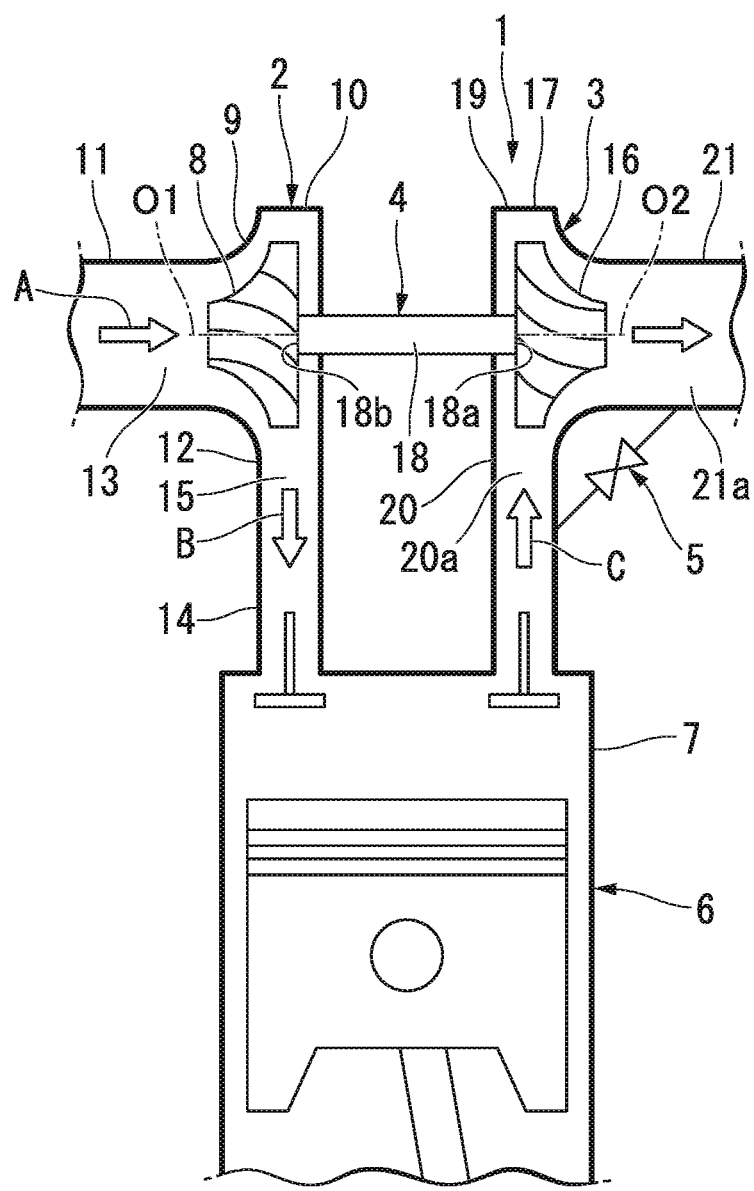
FIG. 1 is a view showing a basic structure of a supercharger according to a first embodiment.

FIG. 1 is a view showing a basic structure of a supercharger according to a first embodiment.

As shown in FIG. 1, the supercharger 1 includes a compressor section 2, a turbine section 3, a bearing section 4, and a waste gate mechanism 5 (rotary valve device).

The compressor section 2 compresses the intake air introduced from an air cleaner (not shown) to send the compressed air into a cylinder 7 of an engine 6. The compressor section 2 includes a compressor wheel 8 and a compressor housing 9.

The compressor wheel 8 rotates about an axis O1. The compressor wheel 8 causes the intake air A flowing in from a direction of an axis O1 to flow due to its centrifugal force while compressing the intake air A from an inner side in a radial direction centered on the axis O1 toward an outer side. Compressed air B compressed by the compressor wheel 8 is discharged toward the outer side of the compressor wheel 8 in the radial direction centered on the axis O1.

The compressor housing 9 includes a wheel housing part 10, a compressor introduction part 11, and a compressor discharge part 12. The wheel housing part 10 is covered from the outside in a state where the compressor wheel 8 is rotatable. The compressor introduction part 11 communicates with the wheel housing part 10 near a rotation center of the compressor wheel 8. The compressor introduction part 11 forms an introduction passage 13 for introducing the intake air A into the wheel housing part 10 in the direction of the axis O1. The compressor discharge part 12 communicates with the wheel housing part 10 on the radially outer side of the compressor wheel 8. The compressor discharge part 12 is connected to an intake manifold 14. The compressor discharge part 12 forms a discharge passage 15 for introducing the compressed air B into the cylinder 7 of the engine 6 via the intake manifold 14.

The turbine section 3 includes a turbine wheel 16 (turbine) and a turbine housing 17.

The turbine wheel 16 recovers a portion of heat energy of exhaust gas C discharged from the engine 6 to rotate around an axis O2.

The turbine housing 17 includes a turbine wheel housing part 19, an exhaust gas introduction part 20, and an exhaust gas discharge part 21.

The turbine wheel housing part 19 covers the turbine wheel 16 from the outside in a state where the turbine wheel 16 is rotatable.

The exhaust gas introduction part 20 forms an exhaust gas introduction passage (a passage on a high-pressure side) 20a for introducing the exhaust gas of the engine 6 into the turbine wheel housing part 19.

The turbine wheel housing part 19 communicates with the exhaust gas introduction part 20 on a radially outer side of the turbine wheel 16.

The exhaust gas discharge part 21 forms an exhaust gas discharge passage (a passage on a low-pressure side) 21a that communicates with the turbine wheel housing part 19 near a rotation center of the compressor wheel 8.

The bearing section 4 includes a rotating shaft 18 and a bearing housing (not shown).

The rotating shaft 18 transmits the rotation of the turbine wheel 16 to the compressor wheel 8. The turbine wheel 16 is fixed to a first end part 18a of the rotating shaft 18, and the compressor wheel 8 is fixed to a second end part 18b thereof.

The bearing housing covers the rotating shaft 18 from the outside. The bearing housing has a bearing (not shown) that rotatably supports the rotating shaft 18. As this bearing, for example, a slide bearing, a rolling bearing, or the like is an exemplary example. The above-described compressor housing 9 and the above-described turbine housing 17 are fixed to the bearing housing, respectively.

The waste gate mechanism 5 adjusts the flow rate of the exhaust gas to be supplied toward the turbine wheel 16. In other words, the waste gate mechanism 5 causes an excessive exhaust gas to flow to the exhaust gas discharge part 21 without flowing through the turbine wheel housing part 19.

Figure 2:
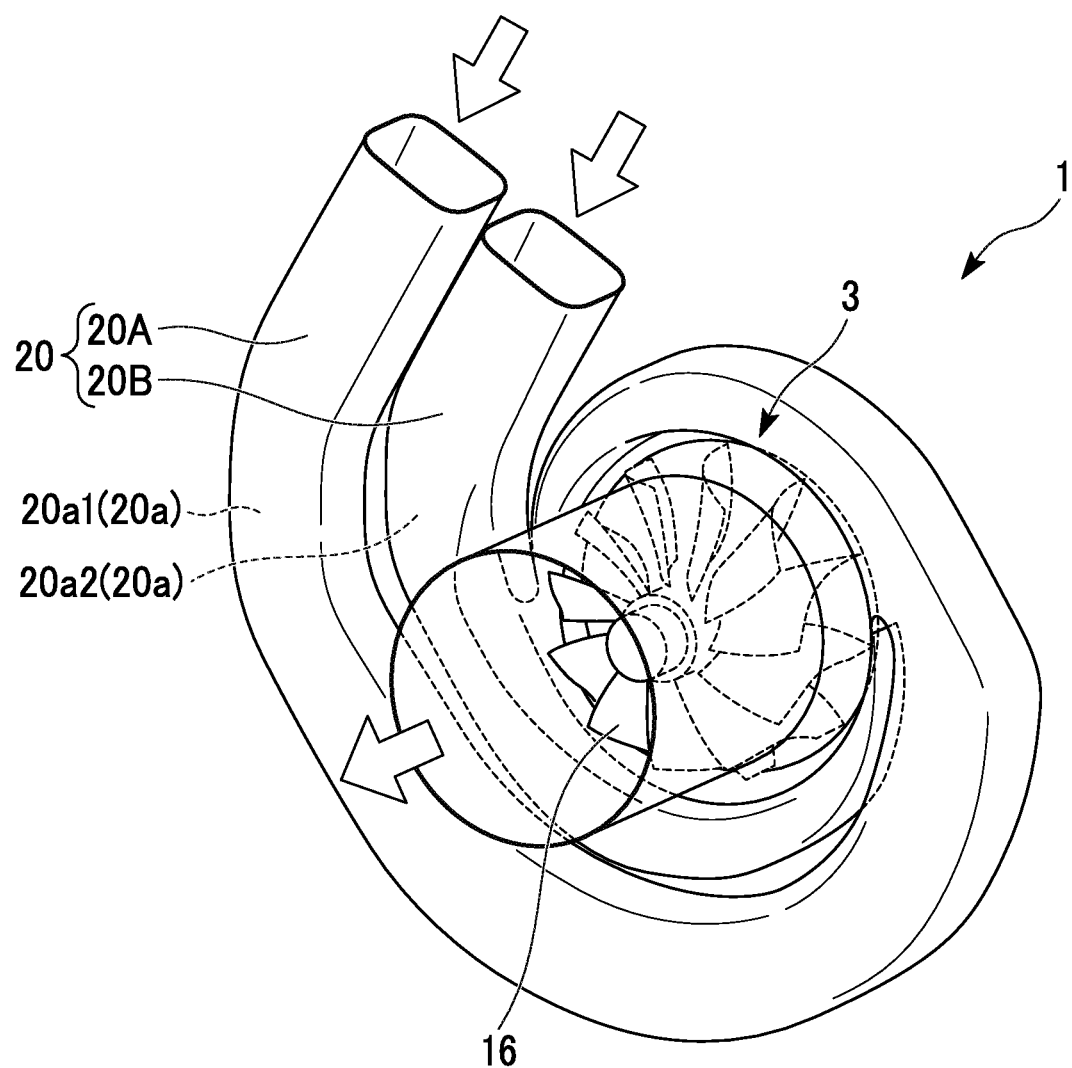
FIG. 2 is a perspective view showing a schematic configuration of a portion of the supercharger according to the first embodiment.
Figure 3:
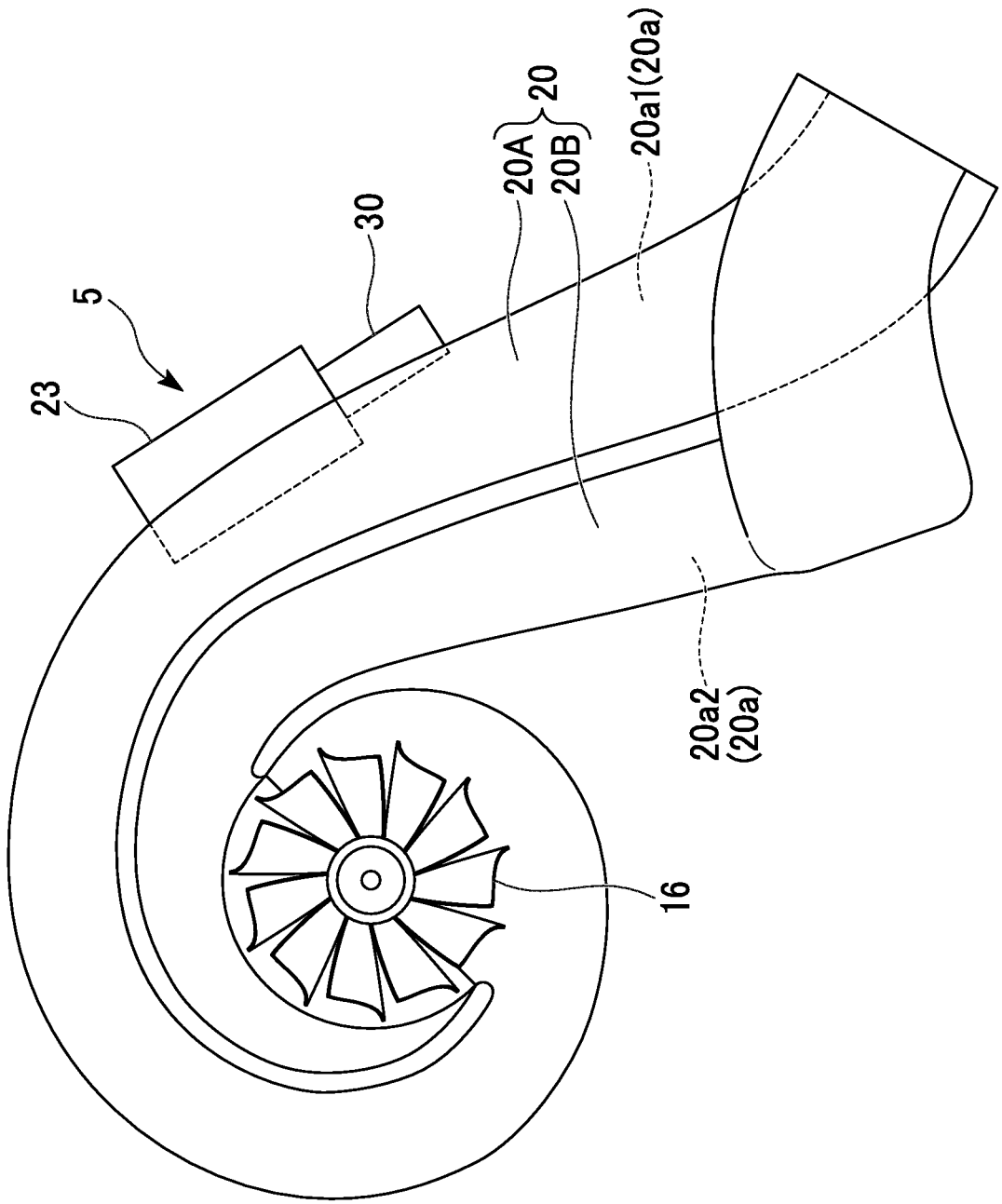
FIG. 3 is a plan view showing a schematic configuration of the portion of the supercharger according to the first embodiment.
Figure 4:
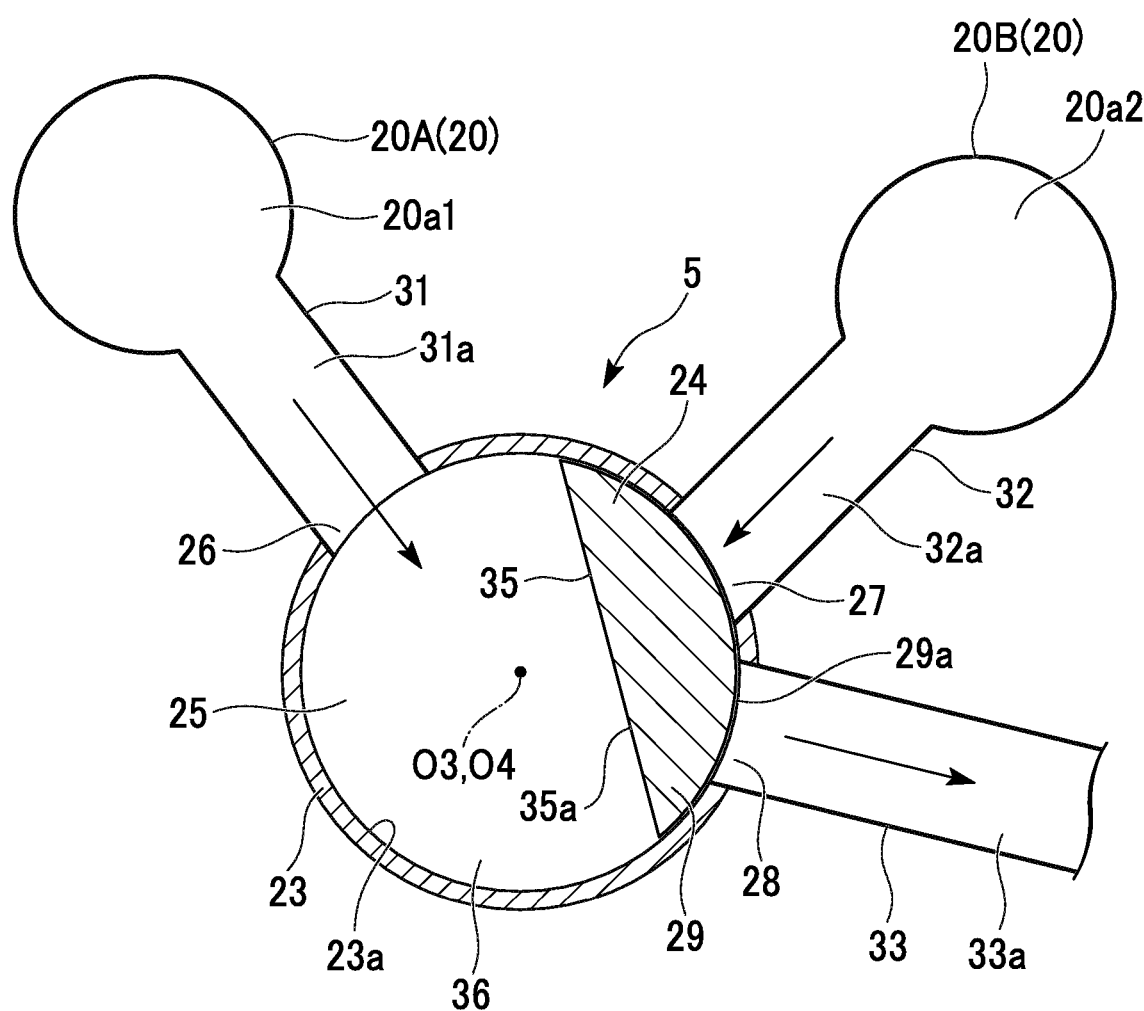
FIG. 4 is a sectional view schematically showing the supercharger according to the first embodiment.
Figure 5:
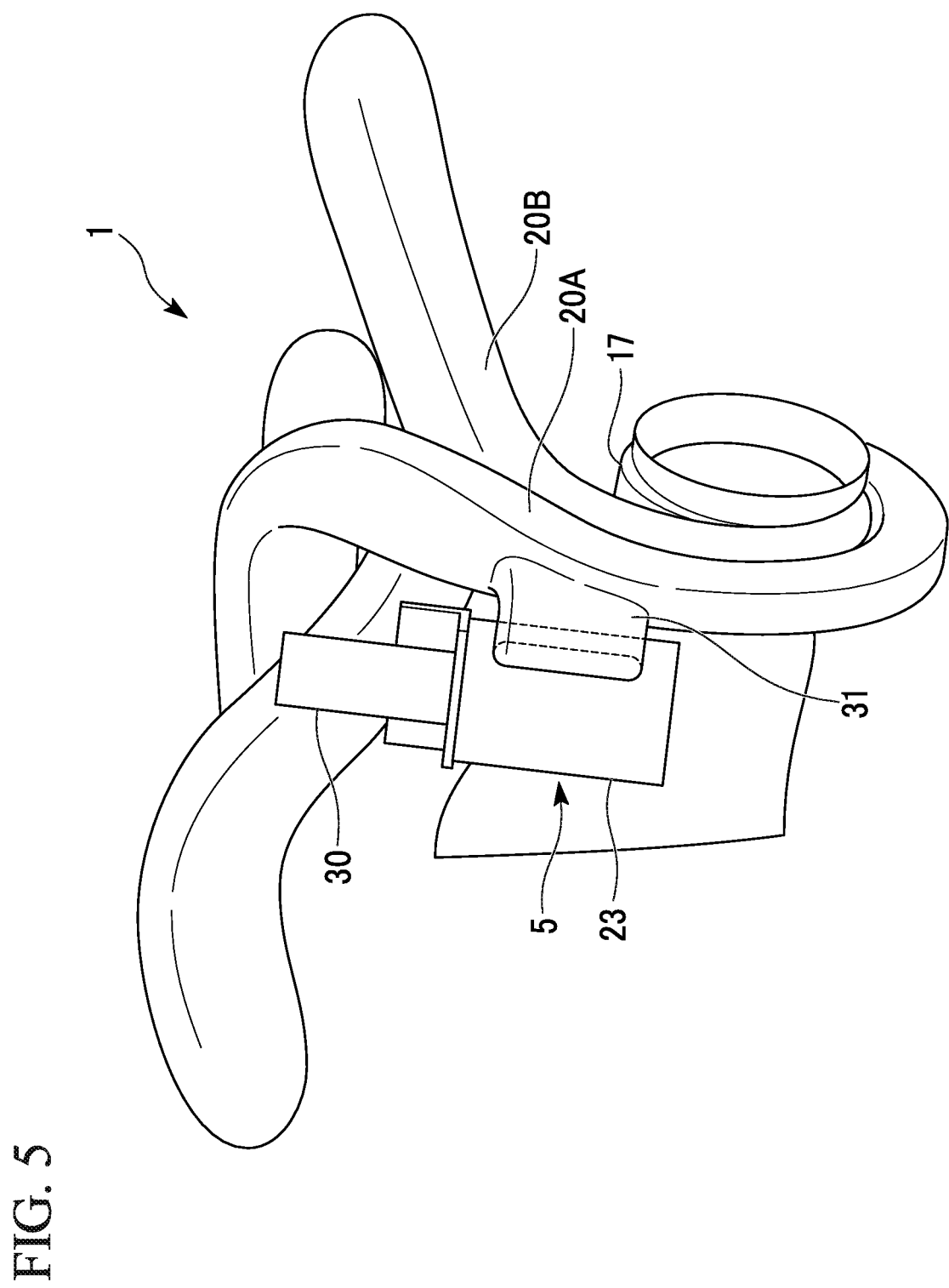
FIG. 5 is a perspective view showing a portion of the supercharger according to the first embodiment.
Figure 6:
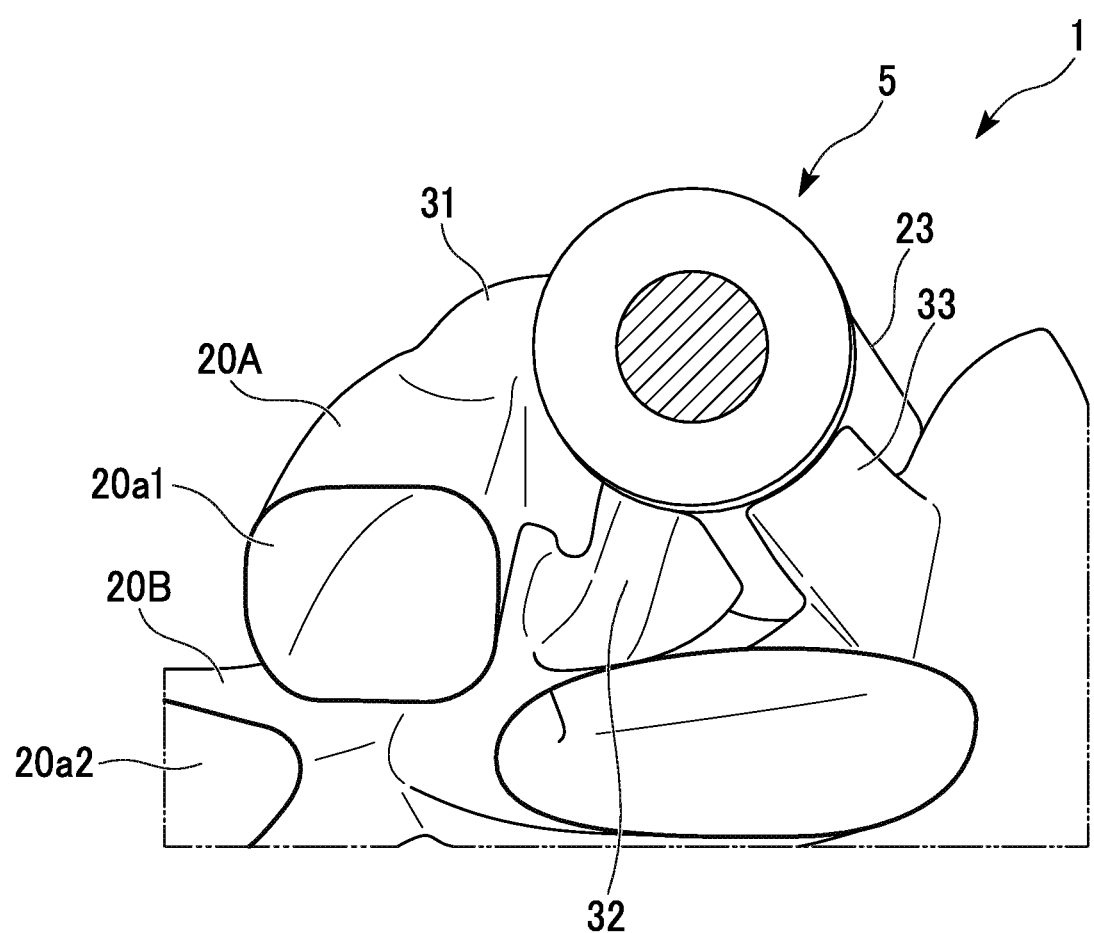
FIG. 6 is a perspective view showing the portion of the supercharger according to the first embodiment.

FIG. 2 is a perspective view showing a schematic configuration of a portion of the supercharger 1. FIG. 3 is a plan view showing a schematic configuration of a portion of the supercharger 1. FIG. 4 is a sectional view schematically showing the supercharger 1, specifically, is a view schematically showing a section orthogonal to an axis of a waste gate valve. FIGS. 5 and 6 are perspective views showing a portion of the supercharger 1.

As shown in FIGS. 2 to 4, the exhaust gas introduction part 20 has a first exhaust gas introduction part 20A that is spirally fouled and a second exhaust gas introduction part 20B that is spirally formed.

The first exhaust gas introduction part 20A forms a first exhaust gas introduction passage 20a1. For example, the exhaust gas from a first cylinder and a fourth cylinder (not shown) among four engine cylinders is introduced into the first exhaust gas introduction part 20A.

The second exhaust gas introduction part 20B forms a second exhaust gas introduction passage 20a2. For example, the exhaust gas from a second cylinder and a third cylinder (not shown) among the four engine cylinders is introduced into the second exhaust gas introduction part 20B. As shown in FIGS. 2 and 3, the second exhaust gas introduction part 20B is provided along with the first exhaust gas introduction part 20A on an inner side in a radial direction of the first exhaust gas introduction part 20A (a radial direction of the turbine wheel 16).

The supercharger 1 is a supercharger a structure in which the two spiral exhaust gas introduction parts 20A and 20B are provided side by side in the radial direction, what is a so-called, "double scroll" type structure.

As shown in FIGS. 4 to 6, the waste gate mechanism 5 includes a first introduction part 31, a second introduction part 32, a chamber 23, a waste gate valve 24 (valve member), and a waste gate outlet part 33 (outlet part).

As shown in FIG. 4, the first introduction part 31 forms a first flow channel 31a. The first introduction part 31 is connected to the first exhaust gas introduction part 20A and the chamber 23. The first introduction part 31 can direct the exhaust gas from the first exhaust gas introduction passage 20a1, to the chamber 23 through the first flow channel 31a.

The second introduction part 32 forms a second flow channel 32a. The second introduction part 32 is connected to the second exhaust gas introduction part 20B and the chamber 23. The second introduction part 32 can direct the exhaust gas from the second exhaust gas introduction passage 20a2, to the chamber 23 through the second flow channel 32a.

The waste gate outlet part 33 fonts an outlet flow channel 33a. The waste gate outlet part 33 is connected to the chamber 23 and the exhaust gas discharge part 21 (refer to FIG. 1). The waste gate outlet part 33 can direct the exhaust gas from the chamber 23, to the exhaust gas discharge part 21 through the outlet flow channel 33a.

The first introduction part 31, the second introduction part 32, a chamber 23, and the waste gate outlet part 33 form a bypass that causes the exhaust gas introduction part 20 and the exhaust gas discharge part 21, which are shown in FIG. 1, to communicate with each other without going through the turbine wheel housing part 19.

As shown in FIG. 4, the chamber 23 is formed in a cylindrical shape that has an axis O3 as a central axis. The chamber 23 has a housing space 25 that houses the waste gate valve 24. A section of an inner peripheral surface 23a of the chamber 23 orthogonal to the axis O3 is circularly formed. That is, the inner peripheral surface 23a is a cylindrical surface that has the axis O3 as the central axis.

In addition, at least a portion of a section, orthogonal to the axis, of the inner peripheral surface of the chamber, may be formed in a circular-arc shape.

The chamber 23 has a first introduction port 26, a second introduction port 27, and an outlet port 28. The first introduction port 26, the second introduction port 27, and the outlet port 28 are respectively elongated holes that are long in a direction of the axis O3. The first introduction port 26, the second introduction port 27, and the outlet port 28 are formed at different positions in a direction around the axis O3.

The first introduction part 31 is connected to the first introduction port 26. Accordingly, the housing space 25 of the chamber 23 communicates with the first exhaust gas introduction passage 20a1 of the first exhaust gas introduction part 20A through the first introduction port 26 and the first flow channel 31a.

The second introduction part 32 is connected to the second introduction port 27. Accordingly, the housing space 25 of the chamber 23 communicates with the second exhaust gas introduction passage 20a2 of the second exhaust gas introduction part 20B through the second introduction port 27 and the second flow channel 32a.

The waste gate outlet part 33 is connected to the outlet port 28. Accordingly, the housing space 25 of the chamber 23 communicates with the exhaust gas discharge passage 21a (refer to FIG. 1) of the exhaust gas discharge part 21 through the outlet port 28 and the outlet flow channel 33a.

The waste gate valve 24 is housed in the housing space 25 of the chamber 23. The waste gate valve 24 is supported by the chamber 23 so as to be rotatable around an axis O4. The waste gate valve 24 switches communication and non-communication between two or more among the first introduction port 26, the second introduction port 27, and the outlet port 28 as will be described below. The chamber 23 functions as a valve casing of the waste gate valve 24.

Figure 7:
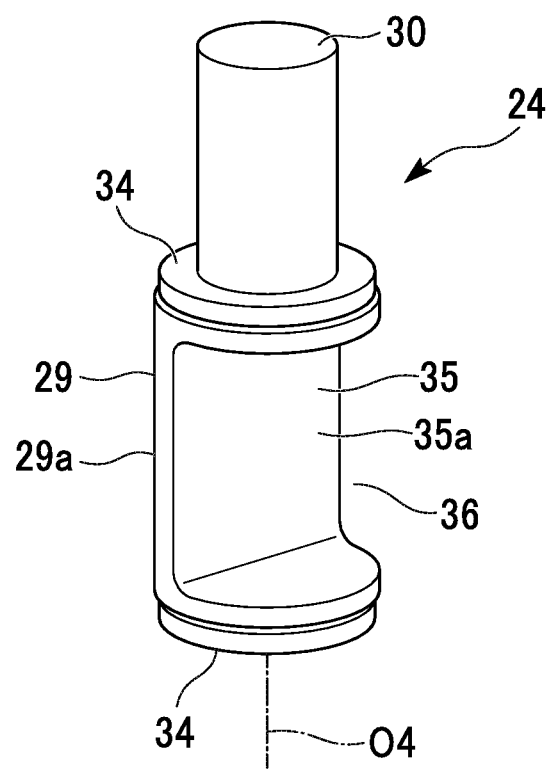
FIG. 7 is a perspective view showing a waste gate valve of the supercharger according to the first embodiment.

FIG. 7 is a perspective view showing the waste gate valve 24. As shown in FIG. 7, the waste gate valve 24 has a valve body 29 and a driving protruding part 30.

The valve body 29 is a substantially columnar shape that has the axis O4 as a central axis. The external diameter of the valve body 29 is slightly smaller than the internal diameter of the chamber 23. A circulation recess 35 is formed at a side part of the valve body 29. A space within the circulation recess 35 is referred to as a main circulation space 36. A bottom surface of the circulation recess 35 is referred to as a main surface 35a. The main surface 35a is a planar surface along the axis O4, and is a surface perpendicular to a radial direction of the valve body 29. The main circulation space 36 is a space secured on the main surface 35a side.

As shown in FIG. 4, a section of the valve body 29, which passes through the main surface 35a and is orthogonal to the axis O4, has a bow shape including from the linear main surface 35a and a circular-arc outer peripheral surface 29a. The outer peripheral surface 29a is a surface opposite to the main surface 35a, that is, a back surface.

As shown in FIG. 7, the driving protruding part 30 is formed in one end surface 34 out of two end surfaces 34 in a direction of the axis O4 of the valve body 29. The driving protruding part 30 protrudes from the end surface 34 along an extension line of the axis O4 of the valve body 29.

The waste gate valve 24 can be rotated around the axis O4, for example, by driving the driving protruding part 30 with the power of an actuator (not shown).

Next, the operation of a supercharger 1 will be described with reference to FIGS. 8 to 10.

Figure 8:
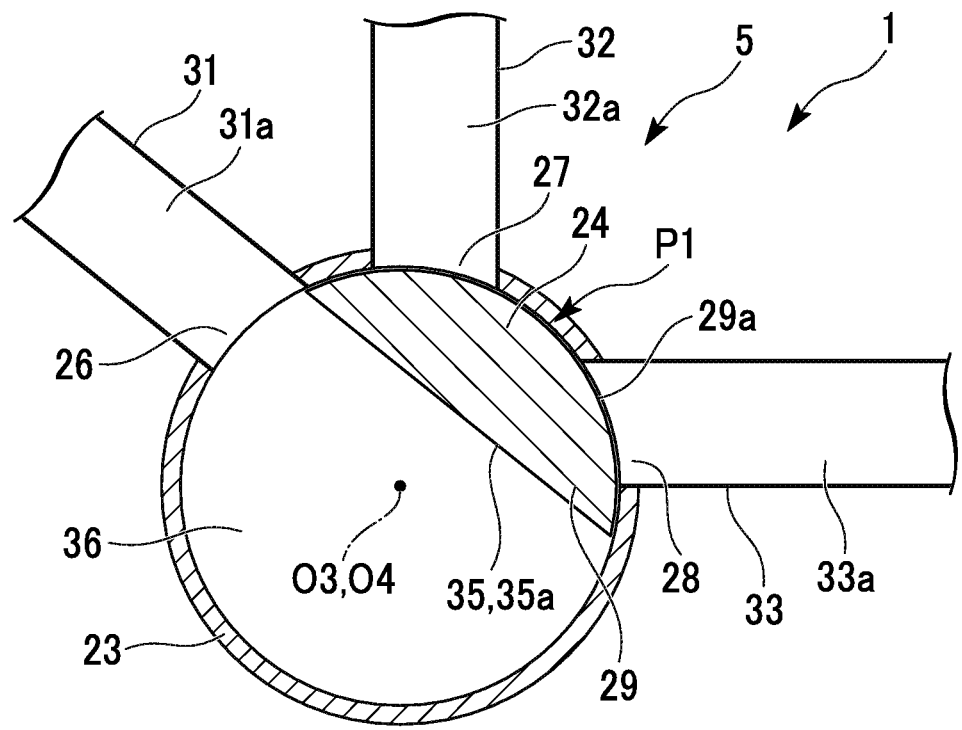
FIG. 8 is a sectional view schematically showing a portion of the supercharger according to the first embodiment.
Figure 9:
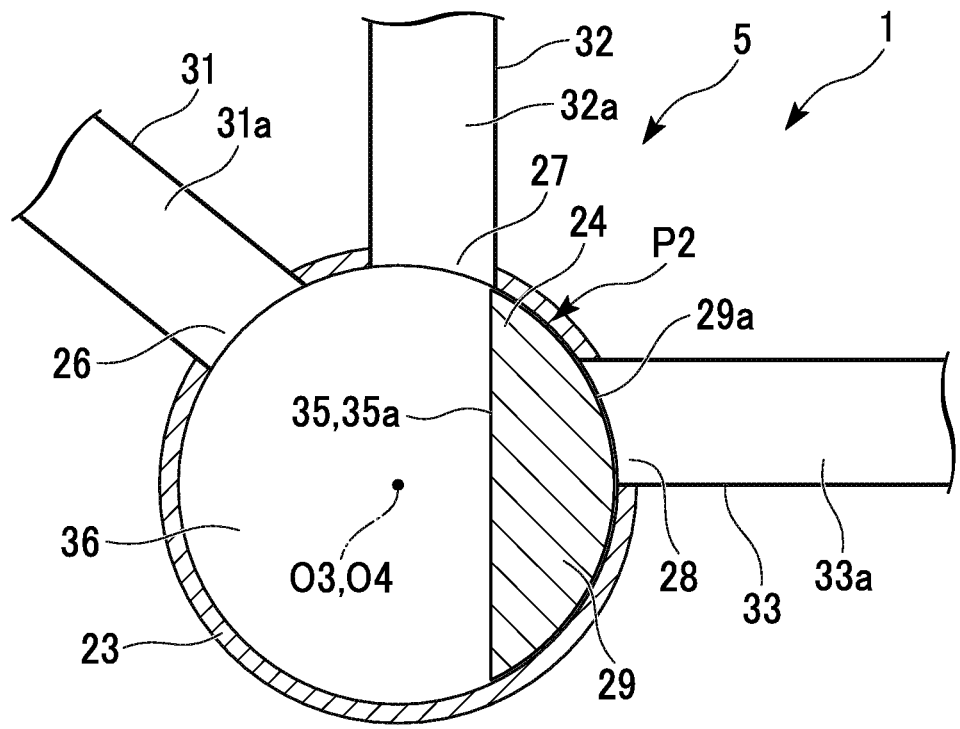
FIG. 9 is a sectional view schematically showing the portion of the supercharger according to the first embodiment.
Figure 10:
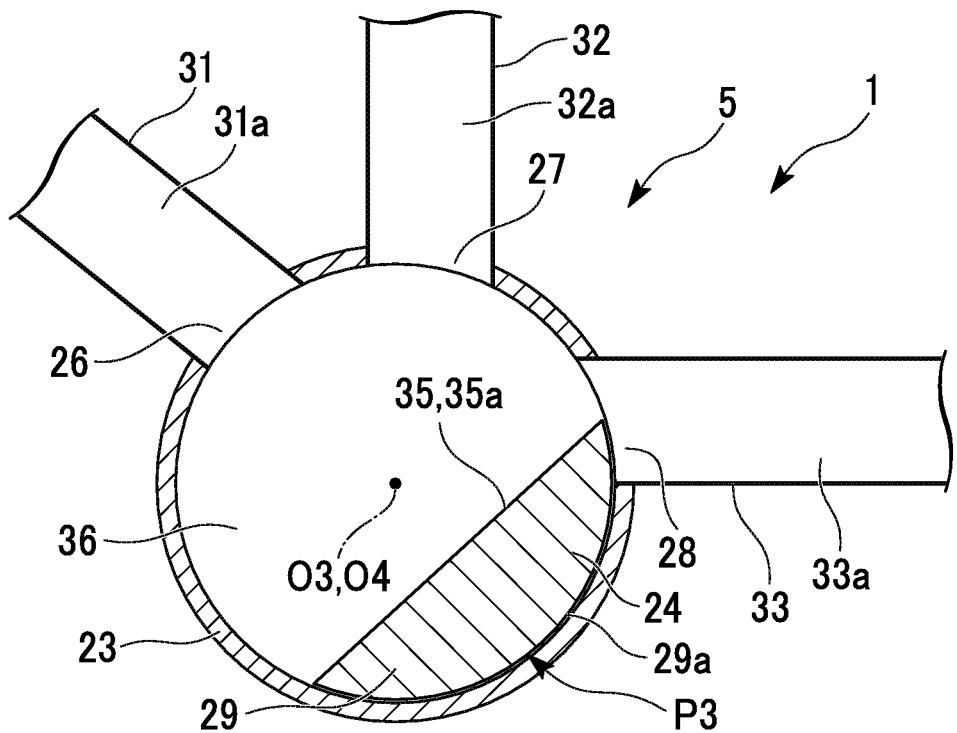
FIG. 10 is a sectional view schematically showing the portion of the supercharger according to the first embodiment.

FIGS. 8 and 10 are sectional views showing a portion of the supercharger 1. As shown in FIGS. 8 to 10, the waste gate valve 24 is rotatable around the axis O4, and is able to open or close one or two or more among the first introduction port 26, the second introduction port 27, and the outlet port 28 in accordance with a rotational position around the axis O4. Hereinafter, details will be described.

As shown in FIG. 8, when the waste gate valve 24 is at a first position P1, an open part of the circulation recess 35 overlaps the first introduction port 26, and thereby, the first introduction port 26 is opened. Accordingly, the first flow channel 31a and the main circulation space 36 of the first introduction part 31 communicate with each other. Since the second introduction port 27 and the outlet port 28 do not overlap the open part of the circulation recess 35 at the first position P1, the second introduction port 27 and the outlet port 28 are closed by the outer peripheral surface 29a of the valve body 29.

When the waste gate valve 24 is at the first position P1, the first flow channel 31a and the second flow channel 32a are separated from each other. For that reason, the output of the turbine section 3 (refer to FIG. 1) during low-speed rotation of the engine 6 can be enhanced.

As shown in FIG. 9, when the waste gate valve 24 is at a second position P2, the open part of the circulation recess 35 overlaps the first introduction port 26 and the second introduction port 27, and thereby, the first introduction port 26 and the second introduction port 27 are opened. Accordingly, the first introduction port 26 and the second introduction port 27 communicate with each other via the main circulation space 36. For that reason, the first flow channel 31a of the first introduction part 31 and the second flow channel 32a of the second introduction part 32 communicate with each other.

Since the outlet port 28 does not overlap the open part of the circulation recess 35 at the second position P2, the outlet port 28 is closed by the outer peripheral surface 29a of the valve body 29. For that reason, the main circulation space 36 does not communicate with the outlet flow channel 33a. Therefore, the exhaust gas within the main circulation space 36 is not discharged from the outlet flow channel 33a.

In the process of shifting from the first position P1 to the second position P2, since the overlap between the open part of the circulation recess 35 and the second introduction port 27 gradually increases, the cross-sectional area (in other words, a valve opening degree) of a flow channel that allows the first flow channel 31a and the second flow channel 32a to communicate with each other gradually increases.

When the waste gate valve 24 is at the second position P2, the first flow channel 31a and the second flow channel 32a communicate with each other. Since the flow channels (the first flow channel 31a and the second flow channel 32a) of the two introduction parts (the first introduction part 31 and the second introduction part 32) communicate with each other, the output of the turbine section 3 (refer to FIG. 1) during high-speed rotation of the engine 6 can be enhanced.

As shown in FIG. 10, when the waste gate valve 24 is at a third position P3, the open part of the circulation recess 35 overlaps a portion of the outlet port 28 in addition to the first introduction port 26 and the second introduction port 27. For that reason, the first introduction port 26, the second introduction port 27, and the outlet port 28 are opened. Accordingly, the first introduction port 26 and the second introduction port 27 communicate with the outlet port 28 via the main circulation space 36. For that reason, the first flow channel 31a of the first introduction part 31 and the second flow channel 32a of the second introduction part 32 communicate with the outlet flow channel 33a of the waste gate outlet part 33.

In the process of shifting from the second position P2 to the third position P3, since the overlap between the open part of the circulation recess 35 and the outlet port 28 gradually increases, the cross-sectional area (in other words, a valve opening degree) of a flow channel that allows the first flow channel 31a and the second flow channel 32a, and the outlet flow channel 33a to communicate with each other gradually increases.

When the waste gate valve 24 is at the third position P3, the flow channels 31a and 32a and the outlet flow channel 33a communicate with each other in addition to the first flow channel 31a and the second flow channel 32a communicating with each other. For that reason, the exhaust gas within the first exhaust gas introduction passage 20a1 and the second exhaust gas introduction passage 20a2 (refer to FIG. 4) can be discharged to a system exterior through the main circulation space 36, the outlet port 28, the outlet flow channel 33a, and the exhaust gas discharge passage 21a. Therefore, it is possible to regulate the output of the turbine section 3 (refer to FIG. 1) and adjust supercharging pressure.

As described earlier, as shown in FIG. 8, in the supercharger 1, the first flow channel 31a and the second flow channel 32a can be separated from each other by locating the waste gate valve 24 at the first position P1 in a state where the rotational speed of the engine 6 (refer to FIG. 1) is low and the flow rate of exhaust gas is low. For that reason, the output of the turbine section 3 (refer to FIG. 1) during the low-speed rotation of the engine 6 (refer to FIG. 1) can be enhanced.

As shown in FIG. 9, in a case where the rotational speed of the engine 6 is high and the flow rate of exhaust gas is high, the first flow channel 31a and the second flow channel 32a can be caused to communicate with each other by locating the waste gate valve 24 at the second position P2. Accordingly, irrespective of adopting the double scroll type (refer to FIGS. 2 and 3), the efficiency of the turbine section 3 can be enhanced when the engine 6 (refer to FIG. 1) rotates at a high-speed.

As shown in FIG. 10, in a case where the supercharging pressure is too high, the waste gate valve 24 can be located at the third position P3, and a portion of exhaust gas can be discharged to the system exterior through the outlet flow channel 33a and the exhaust gas discharge passage 21a (refer to FIG. 1). Accordingly, it is possible and thereby adjusts the supercharging pressure, and it is possible to reduce the inlet pressure of the turbine section 3.

In this way, in the supercharger 1, both the communication (refer to FIG. 9) between the first flow channel 31a and the second flow channel 32a and the discharge (refer to FIG. 10) of exhaust gas are made possible by one waste gate mechanism 5. For that reason, the structure of the device can be simplified, and the size and the cost of the device can be reduced. Hence, in the supercharger 1, exhaust gas can be used efficiently as described above, though the structure is simple.

In the supercharger 1, the waste gate valve 24 around the axis O4 within the chamber 23 is used. For that reason, noise accompanying valve opening and closing can be reduced compared to a supercharger using a flap-type waste gate valve. Additionally, since the waste gate valve 24 may open and close ports depending on the rotation around the axis O4, the uneven wear of the waste gate valve 24 is unlikely to occur. The waste gate valve 24 is excellent compared to the flap-type waste gate valve also in terms of the controllability of the valve operation.

Second Embodiment

Figure 11:
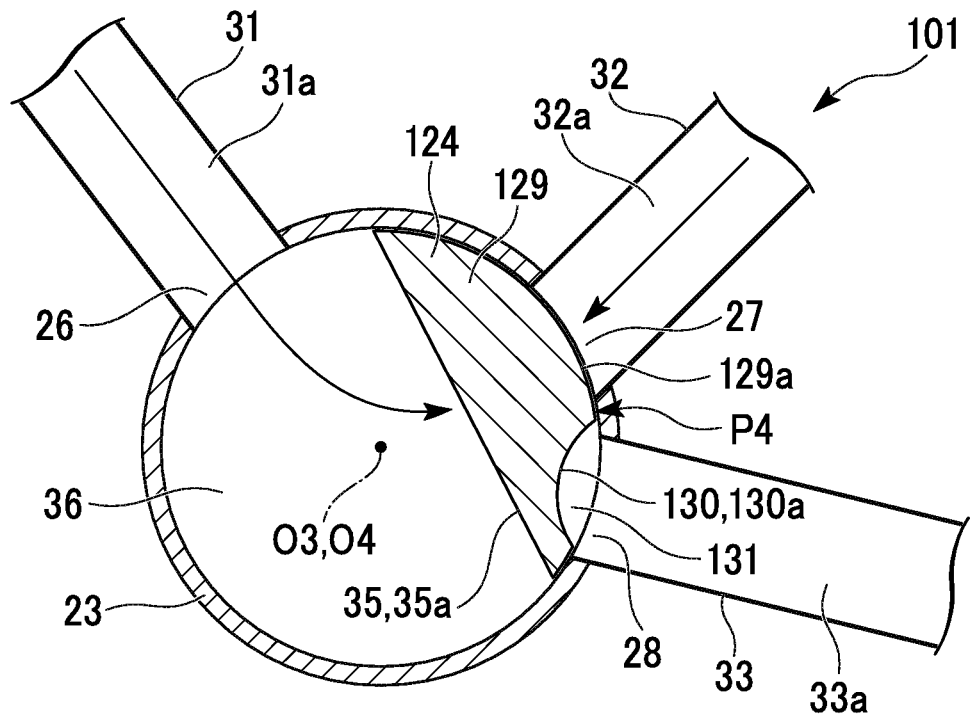
FIG. 11 is a sectional view schematically showing a portion of a supercharger according to a second embodiment.

FIG. 11 is a sectional view schematically showing a portion of a supercharger 101 according to a second embodiment, specifically, is a view schematically showing a section orthogonal to an axis of a waste gate valve 124. Hereinafter, the same components as those of the previous embodiment will be designated by the same reference signs, and a description thereof will be omitted.

The supercharger 101 is different from the supercharger 1 of the first embodiment shown in FIG. 8 and the like in that a cutout 130 is formed in an outer peripheral surface 129a of a valve body 129 of the waste gate valve 124.

The cutout 130 has an inner surface 130a in which a section orthogonal to the axis O4 of the waste gate valve 124 is curvedly recessed. The sectional shape of the inner surface 130a is, for example, a circular arc shape, an elliptical arc shape, or the like. The sectional shape of the inner surface 130a may not be particularly limited as long as gas is capable of circulate into the cutout 130, and may be a rectangular shape, a V-shape, or the like. The cutout 130 is formed in the direction of the axis O4. Gas is capable of circulating through a subsidiary circulation space 131 that is an internal space of the cutout 130.

Next, the operation of the supercharger 101 will be described with reference to FIGS. 11 to 14.

As shown in FIG. 11, when the waste gate valve 124 is at a first position P4, the open part of the circulation recess 35 overlaps the first introduction port 26, and thereby, the first introduction port 26 is opened. The second introduction port 27 and the outlet port 28 are closed by the outer peripheral surface 129a of the valve body 129. For that reason, the output of the turbine section 3 (refer to FIG. 1) during the low-speed rotation of the engine 6 can be enhanced.

Figure 12:
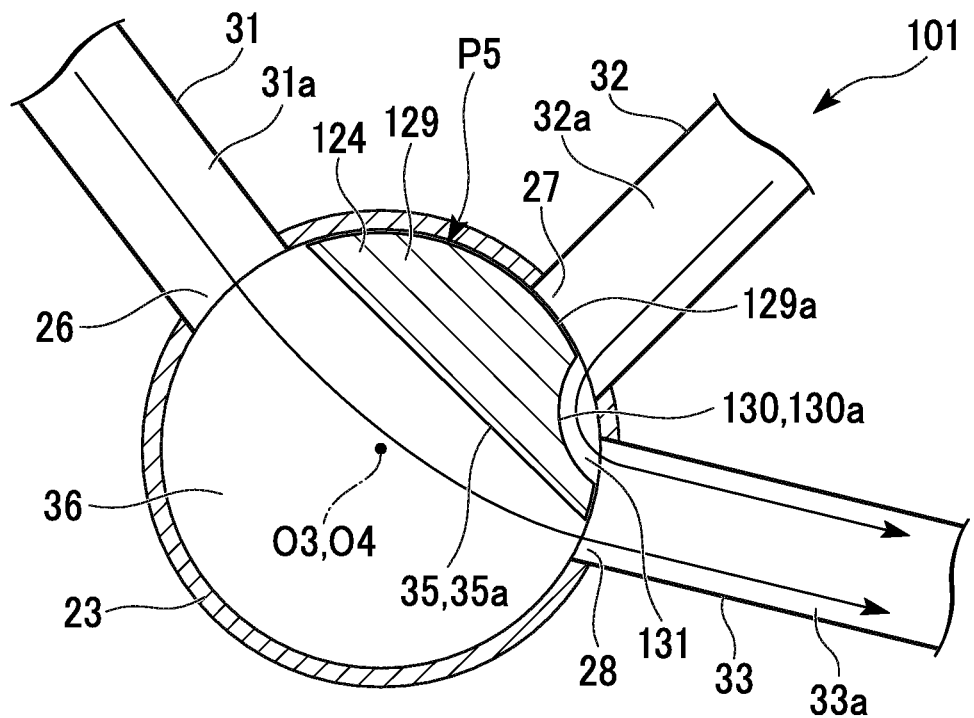
FIG. 12 is a sectional view schematically showing the portion of the supercharger according to the second embodiment.

As shown in FIG. 12, when the waste gate valve 124 is at a second position P5, the open part of the circulation recess 35 overlaps the first introduction port 26, and a portion of the outlet port 28. For that reason, the first introduction port 26 and a portion of the outlet port 28 are opened by the circulation recess 35. Accordingly, the first introduction port 26 communicates with the outlet port 28 via the main circulation space 36. For that reason, the first flow channel 31a of the first introduction part 31 communicates with the outlet flow channel 33a of the waste gate outlet part 33 via the main circulation space 36.

At the second position P5, when the open part of the cutout 130 overlaps a portion of the second introduction port 27 and a portion of the outlet port 28, a portion of the second introduction port 27 and a portion of the outlet port 28 are opened by the cutout 130. Accordingly, the second introduction port 27 and the outlet port 28 communicate with each other via the subsidiary circulation space 131. For that reason, the second flow channel 32a of the second introduction part 32 and the outlet flow channel 33a of the waste gate outlet part 33 communicate with each other.

At the second position P5, since the open part of the circulation recess 35 does not overlap the second introduction port 27 and the open part of the cutout 130 does not overlap the first introduction port 26, the first introduction port 26 and the second introduction port 27 do not communicate with each other.

When the waste gate valve 124 is at the second position P5, the first flow channel 31a and the outlet flow channel 33a communicate with each other via the main circulation space 36. Therefore, the exhaust gas within the first exhaust gas introduction passage 20a1 (refer to FIG. 4) can be discharged to the system exterior through the first flow channel 31a, the main circulation space 36, the outlet port 28, the outlet flow channel 33a, and the exhaust gas discharge passage 21a (refer to FIG. 1). Additionally, since the second flow channel 32a and the outlet flow channel 33a communicate with each other via the subsidiary circulation space 131, the exhaust gas within the second exhaust gas introduction passage 20a2 (refer to FIG. 4) can be discharged to the system exterior through the second flow channel 32a, the subsidiary circulation space 131, the outlet port 28, the outlet flow channel 33a, and the exhaust gas discharge passage 21a (refer to FIG. 1).

At the second position P5, since exhaust gas can be caused to flow to the outlet flow channel 33a, it is possible to regulate the output of the turbine section 3 and adjust the supercharging pressure.

In addition, at the second position P5, the exhaust gas from the first flow channel 31a and the second flow channel 32a can be directed to the outlet flow channel 33a in a state where the first introduction port 26 and the second introduction port 27 do not communicate with each other. Accordingly, since the amount of the exhaust gas directed to the outlet flow channel 33a can be increased, it is possible to efficiently heat a catalyst (not shown) on a downstream side and promote activation of the catalyst.

Figure 13:
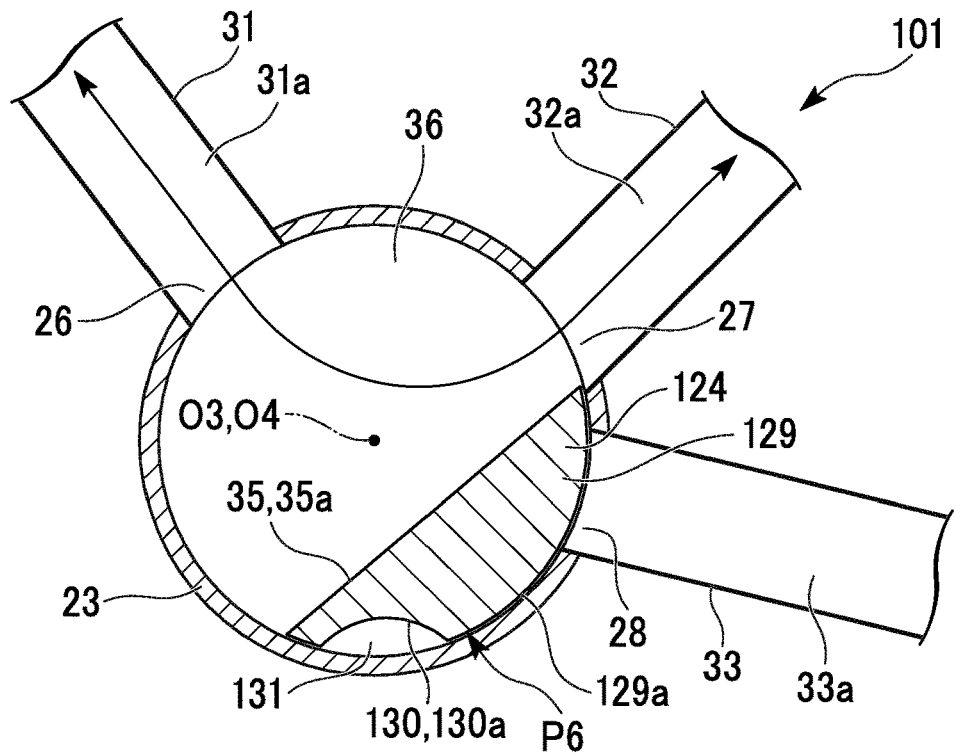
FIG. 13 is a sectional view schematically showing the portion of the supercharger according to the second embodiment.

As shown in FIG. 13, when the waste gate valve 124 is at a third position P6, the open part of the circulation recess 35 overlaps the first introduction port 26 and the second introduction port 27, and thereby, the first introduction port 26 and the second introduction port 27 are opened. Accordingly, the first introduction port 26 and the second introduction port 27 communicate with each other via the main circulation space 36. For that reason, the first flow channel 31a of the first introduction part 31 and the second flow channel 32a of the second introduction part 32 communicate with each other.

At the third position P6, the outlet port 28 is closed by the outer peripheral surface 129a of the valve body 129. For that reason, the main circulation space 36 does not communicate with the outlet flow channel 33a. Therefore, the exhaust gas within the main circulation space 36 is not discharged from the outlet flow channel 33a.

At the third position P6, since the first flow channel 31a and the second flow channel 32a communicate with each other, the output of the turbine section 3 during the high-speed rotation of the engine 6 can be enhanced.

Figure 14:
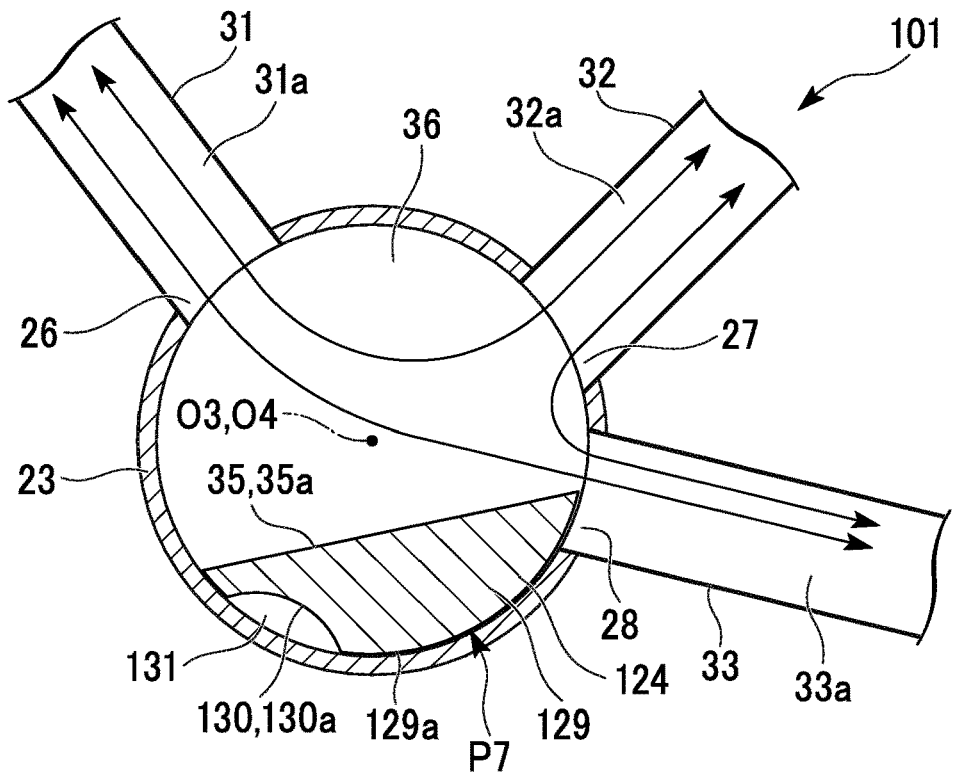
FIG. 14 is a sectional view schematically showing the portion of the supercharger according to the second embodiment.

As shown in FIG. 14, when the waste gate valve 124 is at the fourth position P7, the first introduction port 26, the second introduction port 27, and the outlet port 28 are opened by the circulation recess 35. Accordingly, the first introduction port 26 and the second introduction port 27 communicate with the outlet port 28 via the main circulation space 36.

When the waste gate valve 124 is at the fourth position P7, the flow channels 31a and 32a and the outlet flow channel 33a communicate with each other in addition to the first flow channel 31a and the second flow channel 32a communicating with each other. For that reason, the exhaust gas within the first exhaust gas introduction passage 20a1 and the second exhaust gas introduction passage 20a2 (refer to FIG. 4) can be discharged to the system exterior through the main circulation space 36, the outlet port 28, the outlet flow channel 33a, and the exhaust gas discharge passage 21a (refer to FIG. 1). Therefore, the output of the turbine section 3 during the high-speed rotation of the engine 6 can be enhanced. Moreover, it is possible to regulate the output of the turbine section 3 (refer to FIG. 1) and adjust the supercharging pressure.

In the supercharger 101, as described above, at the second position P5 as shown in FIG. 12, the exhaust gas from the first flow channel 31a and the second flow channel 32a can be directed to the outlet flow channel 33a in a state where the first introduction port 26 and the second introduction port 27 do not communicate with each other. Accordingly, since the amount of the exhaust gas directed to the outlet flow channel 33a can be increased, it is possible to efficiently heat a catalyst (not shown) on a downstream side and promote activation of the catalyst.

Third Embodiment

Figure 15:
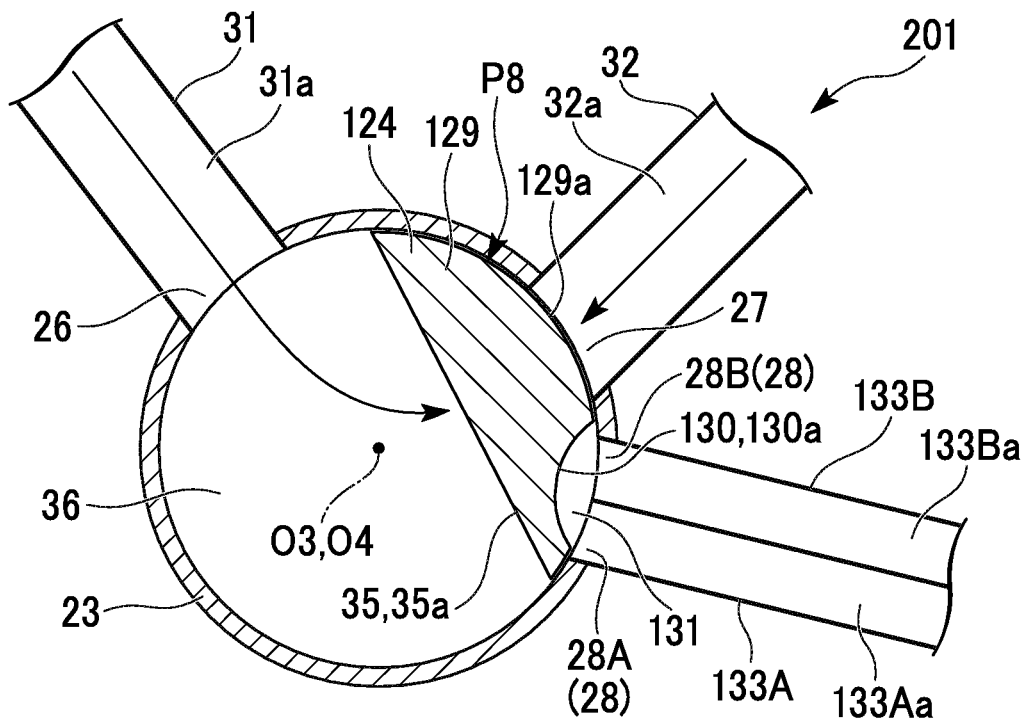
FIG. 15 is a sectional view schematically showing a portion of a supercharger according to a third embodiment.

FIG. 15 is a sectional view schematically showing a portion of a supercharger 201 according to a third embodiment, specifically, is a view schematically showing a section orthogonal to the axis of the waste gate valve 124. Hereinafter, the same components as those of the previous embodiment will be designated by the same reference signs, and the description thereof will be omitted.

The supercharger 201 is different from the supercharger 101 of the second embodiment shown in FIG. 11 and the like in that the supercharger 201 includes two waste gate outlet parts 133A and 133B, that is, a first waste gate outlet part 133A and a second waste gate outlet part 133B, instead of the waste gate outlet part 33. The first waste gate outlet part 133A is connected to a portion of the outlet port 28 (first outlet port 28A). The second waste gate outlet part 133B is connected to the other part (second outlet port 28B) of the outlet port 28. The first waste gate outlet part 133A forms a first outlet flow channel 133Aa. The second waste gate outlet part 133B forms a second outlet flow channel 133Ba. The first outlet flow channel 133Aa and the second outlet flow channel 133Ba are independent from each other.

Next, the operation of the supercharger 201 will be described with reference to FIGS. 15 to 18.

As shown in FIG. 15, when the waste gate valve 124 is at a first position P8, the first introduction port 26 is opened by the circulation recess 35. The second introduction port 27 and the outlet port 28 are closed by the outer peripheral surface 129a of the valve body 129.

Figure 16:
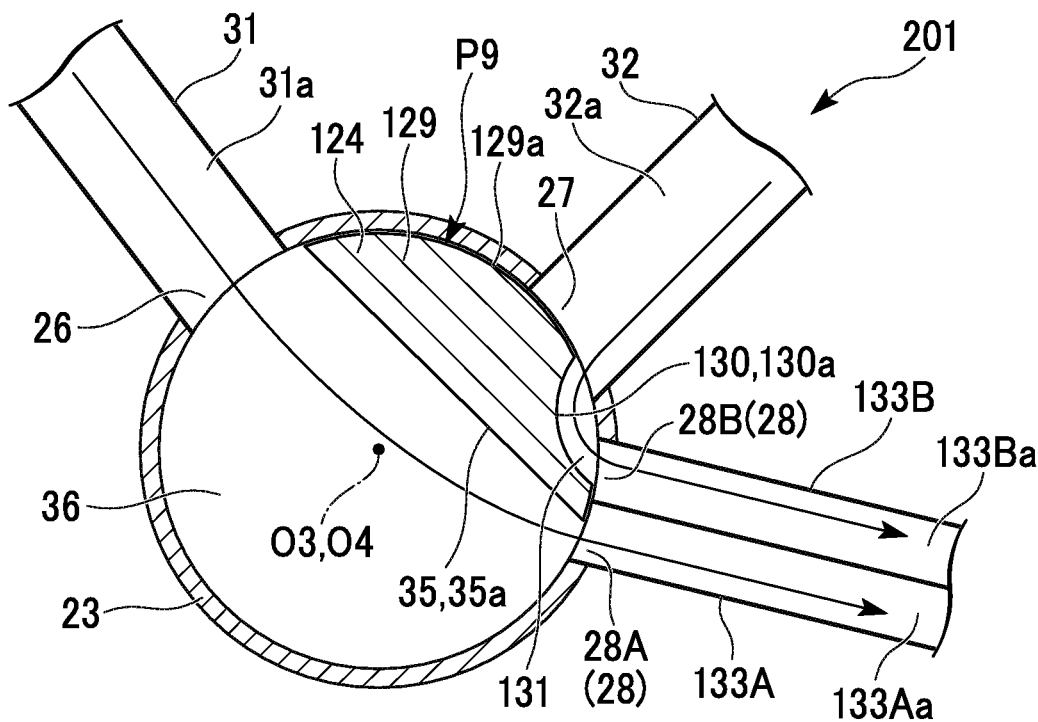
FIG. 16 is a sectional view schematically showing the portion of the supercharger according to the third embodiment.

As shown in FIG. 16, when the waste gate valve 124 is at a second position P9, the first introduction port 26 and a portion of the outlet port 28 (first outlet port 28A) are opened by the circulation recess 35. Accordingly, the first introduction port 26 communicates with a portion of the outlet port 28 (first outlet port 28A) via the main circulation space 36. For that reason, the first flow channel 31a of the first introduction part 31 communicates with the first outlet flow channel 133Aa of the first waste gate outlet part 133A via the main circulation space 36.

At the second position P9, the second introduction port 27 and the other part (second outlet port 28B) of the outlet port 28 are opened by the cutout 130. Accordingly, the second introduction port 27 communicates with the other part (second outlet port 28B) of the outlet port 28 via the subsidiary circulation space 131. For that reason, the second flow channel 32a of the second introduction part 32 communicates with the second outlet flow channel 133Ba of the second waste gate outlet part 133B via the subsidiary circulation space 131. At the second position P9, the first introduction port 26 and the second introduction port 27 do not communicate with each other.

When the waste gate valve 124 is at the second position P9, the first flow channel 31a and the first outlet flow channel 133Aa communicate with each other via the main circulation space 36. Therefore, the exhaust gas within the first exhaust gas introduction passage 20a1 (refer to FIG. 4) can be discharged to the system exterior through the main circulation space 36, the outlet port 28 (first outlet port 28A), the first outlet flow channel 133Aa, and the exhaust gas discharge passage 21a (refer to FIG. 1). Additionally, since the second flow channel 32a and the second outlet flow channel 133Ba communicate with each other via the subsidiary circulation space 131, the exhaust gas within the second exhaust gas introduction passage 20a2 (refer to FIG. 4) can be discharged to the system exterior through the subsidiary circulation space 131, the outlet port 28 (second outlet port 28B), the second outlet flow channel 133Ba, and the exhaust gas discharge passage 21a (refer to FIG. 1).

At the second position P9, it is possible to regulate the output of the turbine section 3 and adjust the supercharging pressure.

In addition, at the second position P9, the exhaust gas from the first flow channel 31a and the second flow channel 32a can be directed to the outlet flow channels 133Aa and 133Ba in a state where the first introduction port 26 and the second introduction port 27 do not communicate with each other. Since the outlet flow channels 133Aa and 133Ba are independent from each other, a leakage flow between the two the outlet flow channels 133Aa and 133Ba can be prevented, and the discharge amount of exhaust gas can be increased. Therefore, the catalyst (not shown) on the downstream side can be more efficiently heated with the exhaust gas, and activation of the catalyst can be promoted.

Figure 17:
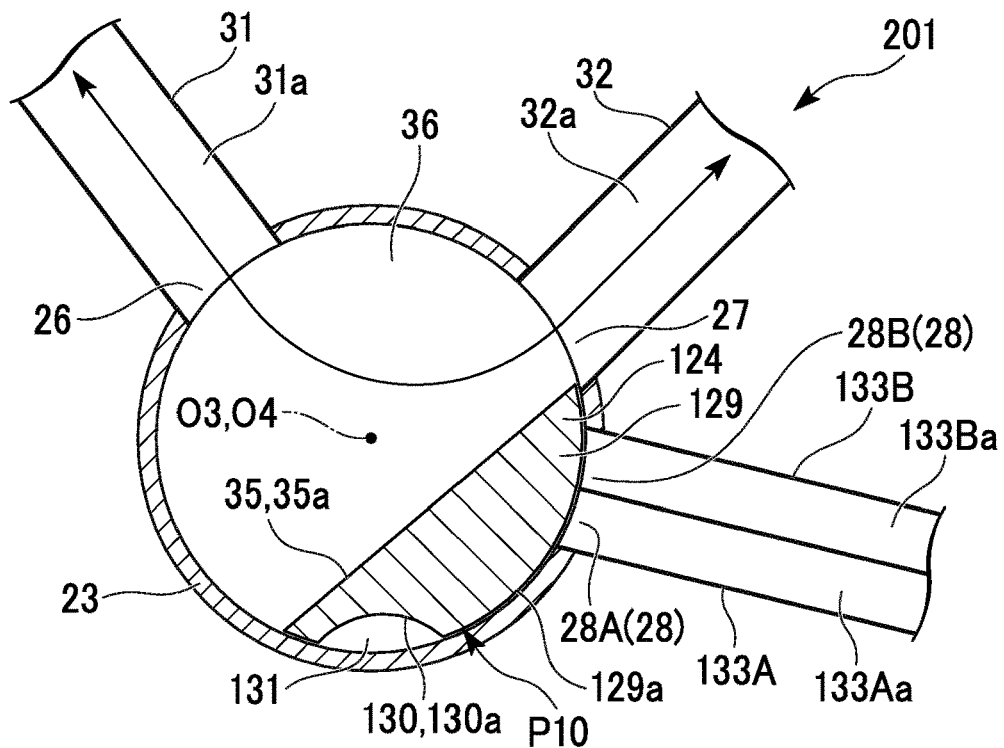
FIG. 17 is a sectional view schematically showing the portion of the supercharger according to the third embodiment.

As shown in FIG. 17, when the waste gate valve 124 is at the third position P10, the first introduction port 26 and the second introduction port 27 are opened. Accordingly, since the first introduction port 26 and the second introduction port 27 communicate with each other via the main circulation space 36, the first flow channel 31*a* of the first introduction part 31 and the second flow channel 32*a* of the second introduction part 32 communicate with each other.

At the third position P10, the outlet port 28 is closed by the outer peripheral surface 129*a* of the valve body 129.

At the third position P10, since the first flow channel 31*a* and the second flow channel 32*a* communicate with each other, the output of the turbine section 3 during the high-speed rotation of the engine 6 can be enhanced.

Figure 18:
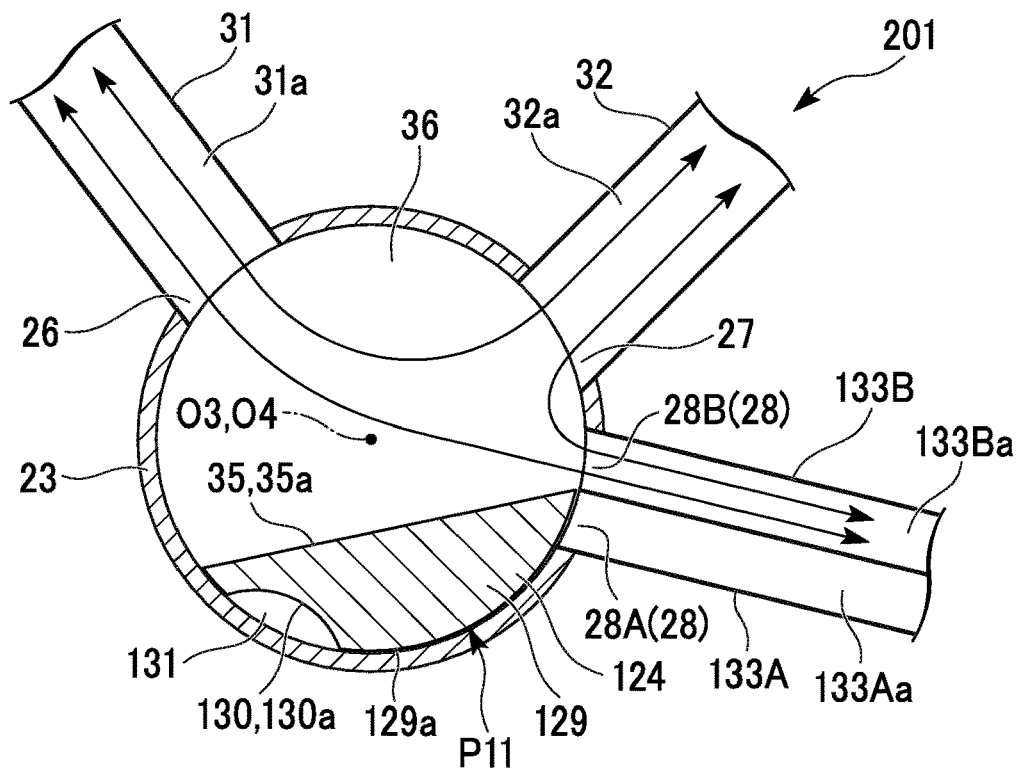
FIG. 18 is a sectional view schematically showing the portion of the supercharger according to the third embodiment.

As shown in FIG. 18, when the waste gate valve 124 is at the fourth position P11, the first introduction port 26, second introduction port 27, and the outlet port 28 are opened by the circulation recess 35. Accordingly, the first introduction port 26 and the second introduction port 27 communicate with the outlet port 28 via the main circulation space 36.

When the waste gate valve 124 is at the fourth position P11, the flow channels 31*a* and 32*a* and the outlet flow channels 133Aa and 133Ba communicate with each other in addition to the first flow channel 31*a* and the second flow channel 32*a* communicating with each other. For that reason, the exhaust gas within the first exhaust gas introduction passage 20*a*1 and the second exhaust gas introduction passage 20*a*2 (refer to FIG. 4) can be discharged to the system exterior through the main circulation space 36, the outlet port 28, the outlet flow channels 133Aa and 133Ba, and the exhaust gas discharge passage 21*a* (refer to FIG. 1). Therefore, the output of the turbine section 3 during the high-speed rotation of the engine 6 can be enhanced. Moreover, it is possible to regulate the output of the turbine section 3 (refer to FIG. 1) and adjust the supercharging pressure.

In the supercharger 201, as described above, at the second position P9 as shown in FIG. 16, the exhaust gas from the first flow channel 31*a* and the second flow channel 32*a* can be respectively directed to the outlet flow channels 133Aa and 133Ba in a state where the first introduction port 26 and the second introduction port 27 do not communicate with each other. Since the outlet flow channels 133Aa and 133Ba are independent from each other, a leakage flow between the two outlet flow channels 133Aa and 133Ba can be prevented, and the discharge amount of exhaust gas can be increased. Therefore, the catalyst (not shown) on the downstream side can be more efficiently heated with the exhaust gas, and activation of the catalyst can be promoted.

Figure 19:
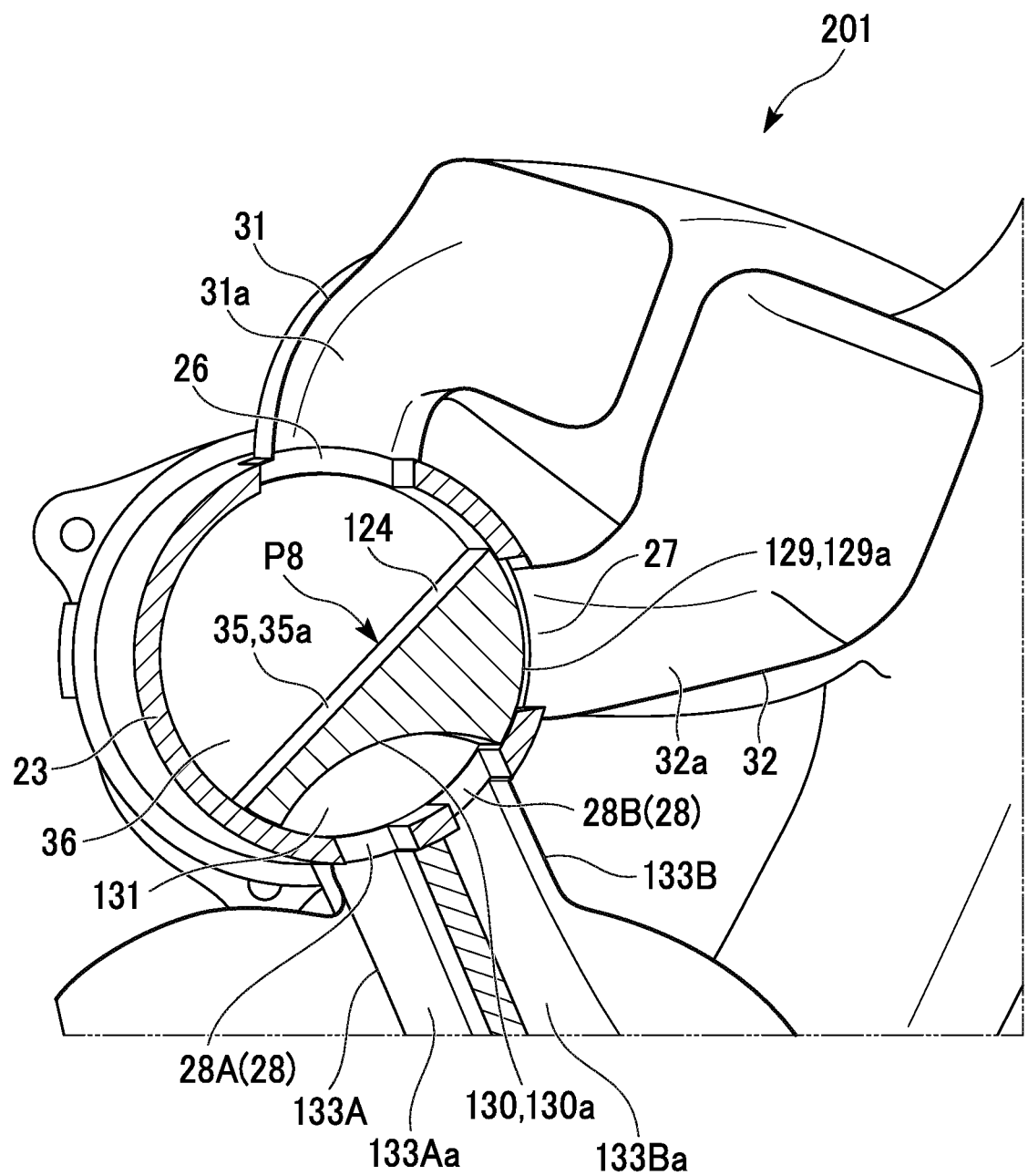
FIG. 19 is a sectional view showing a schematic configuration of a portion of a specific example of the supercharger according to the third embodiment.
Figure 20:
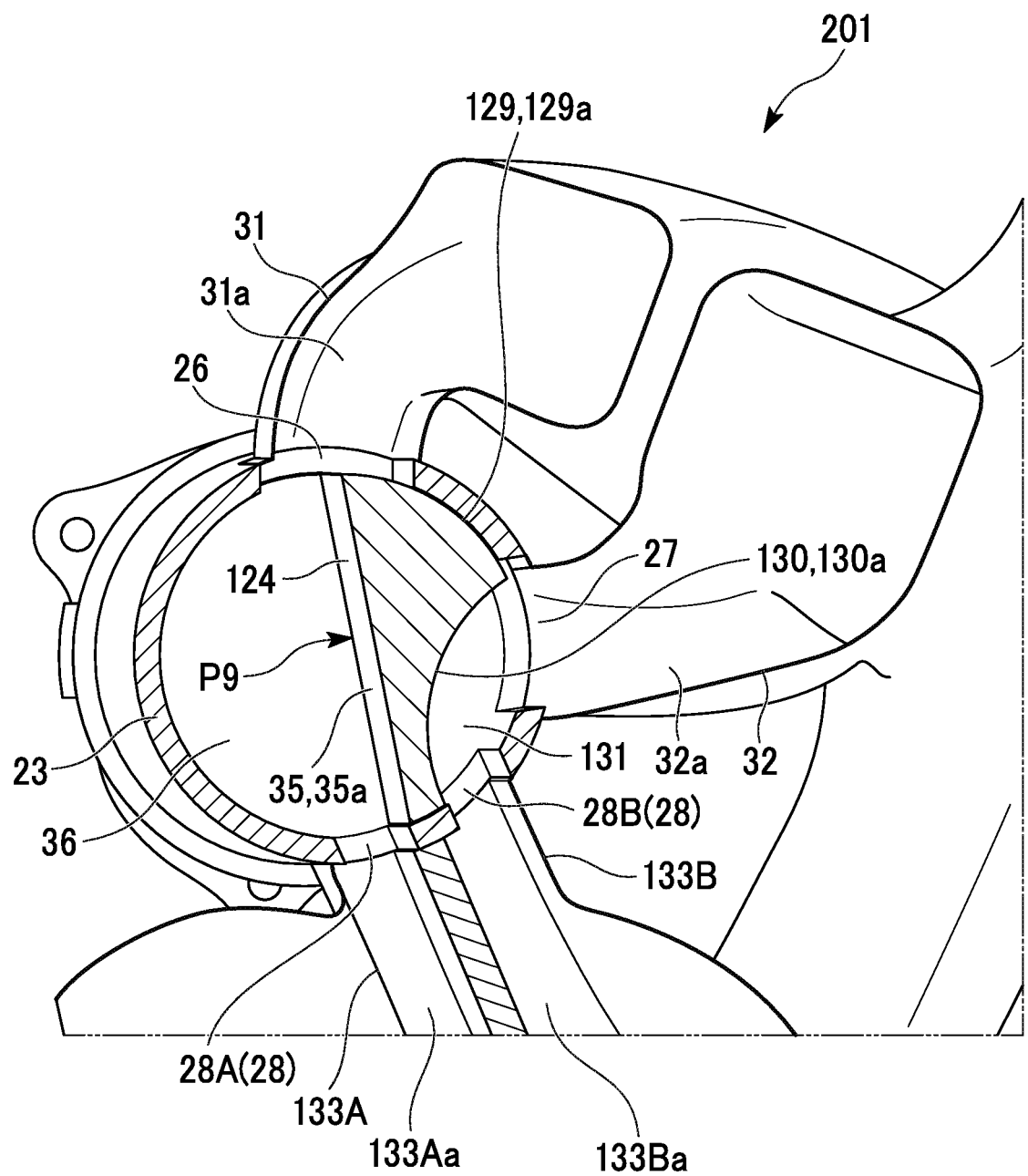
FIG. 20 is a sectional view showing the schematic configuration of the portion of the specific example of the supercharger according to the third embodiment.

FIGS. 19 and 20 are sectional views showing a schematic configurations of a portion of a specific example of the supercharger 201.

As shown in FIG. 19, the supercharger 201 has the first waste gate outlet part 133A and the second waste gate outlet part 133B. The first waste gate outlet part 133A is connected to a portion of the outlet port 28 (first outlet port 28A). The second waste gate outlet part 133B is connected to the other part (second outlet port 28B) of the outlet port 28.

In FIG. 19, the waste gate valve 124 is at a first position P8 (refer to FIG. 15). The first introduction port 26 is opened by the circulation recess 35. The second introduction port 27 and the outlet port 28 are closed by the outer peripheral surface 129*a* of the valve body 129.

As shown in FIG. 20, when the waste gate valve 124 is at a second position P9 (refer to FIG. 16), the first introduction port 26 and a portion of the outlet port 28 (first outlet port 28A) are opened by the circulation recess 35. The second introduction port 27 and the other part (second outlet port 28B) of the outlet port 28 are opened by the cutout 130. At the second position P9, the first introduction port 26 and the second introduction port 27 do not communicate with each other. For that reason, the first flow channel 31*a* and the first outlet flow channel 133Aa communicate with each other via the main circulation space 36, and the second flow channel 32*a* and the second outlet flow channel 133Ba communicate with each other via the subsidiary circulation space 131.

Figure 21:
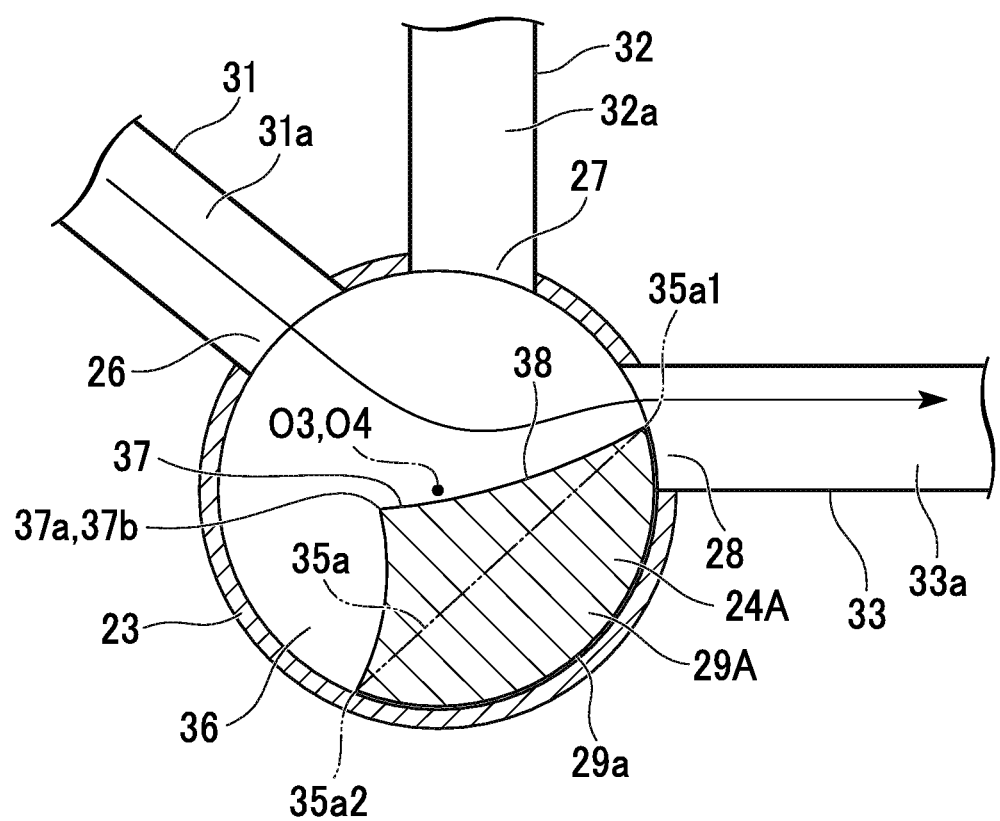
FIG. 21 is a sectional view schematically showing a first modification example of a valve member of the supercharger according to the first embodiment.
Figure 22:
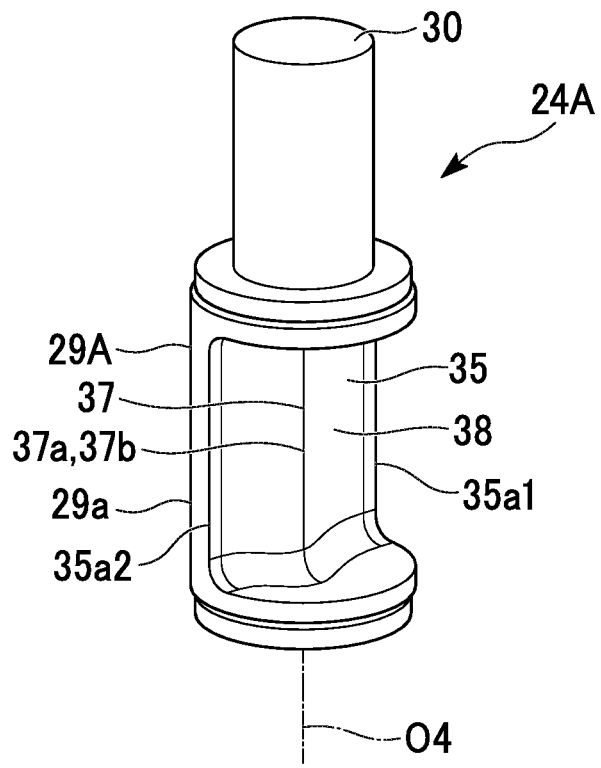
FIG. 22 is a perspective view showing the valve member of the preceding figure.

FIG. 21 is a sectional view schematically showing a waste gate valve 24A that is a first modification example of the waste gate valve 24 of the supercharger 1 according to the first embodiment. FIG. 21 is a view showing a section orthogonal to the axis O4. FIG. 22 is a perspective view showing the waste gate valve 24A.

As shown in FIGS. 21 and 22, the waste gate valve 24A is different from the waste gate valve 24 shown in FIGS. 7 and 8 in that a guide protrusion 37 is formed on the main surface 35*a* of a valve body 29A.

As shown in FIG. 22, the guide protrusion 37 is formed to protrude from the main surface 35*a*. The guide protrusion 37 has a certain protruding height in the direction of the axis O4.

As shown in FIG. 21, a section of the guide protrusion 37 orthogonal to the axis O4 has a shape of which the height gradually decreases from a peak 37*a* toward both side edges 35*a*1 and 35*a*2 of the main surface 35*a*. A surface ranging from a ridgeline 37*b* including the peak 37*a* of the guide protrusion 37 to one side edge 35*a*1 of the main surface 35*a* is referred to as a guide surface 38. The guide surface 38 is a surface in which a section orthogonal to the axis O4 is curvedly recessed. The sectional shape of the guide surface 38 is, for example, a circular arc shape, an elliptical arc shape, or the like.

In FIG. 21, the position (circumferential position) of the waste gate valve 24A around the axis O4 is a position where the first introduction port 26, the second introduction port 27, and the outlet port 28 are opened by the circulation recess 35. The waste gate valve 24A is inclined with respect to a radial direction of the guide surface 38. At the position shown in FIG. 21, an inclination direction of the guide surface 38 of the waste gate valve 24A is a direction approaching the outlet port 28 while a protruding height of the guide surface 38 with respect to the main surface 35*a* is reduced outward in the radial direction.

By virtue of this configuration, the exhaust gas, which has flowed into the main circulation space 36 from the first introduction port 26 and the second introduction port 27, flows toward the outlet port 28 while being influenced by the guide surface 38 of the guide protrusion 37. For example, a portion of the exhaust gas, which has flowed into the main circulation space 36 from the first introduction port 26, flows toward the outlet port 28 while the flow thereof is arranged by flowing along the guide surface 38 from the ridgeline 37*b* toward the side edge 35*a*1. For that reason, the flow resistance of exhaust gas becomes small and the exhaust gas smoothly flows toward the outlet port 28. The guide protrusion 37 also affects the flow resistance of the exhaust gas that flows into the outlet port 28 from the second introduction port 27. In this way, the guide protrusion 37 can adjust the flow resistance of the exhaust gas that flows into the outlet port 28 from at least one of the first introduction port 26 and the second introduction port 27. Therefore, the flow rate of the exhaust gas that flows in from the first introduction port 26, the flow rate of the exhaust gas that flows in from the second introduction port 27, and the ratio of the flow rates can be adjusted.

Figure 23:
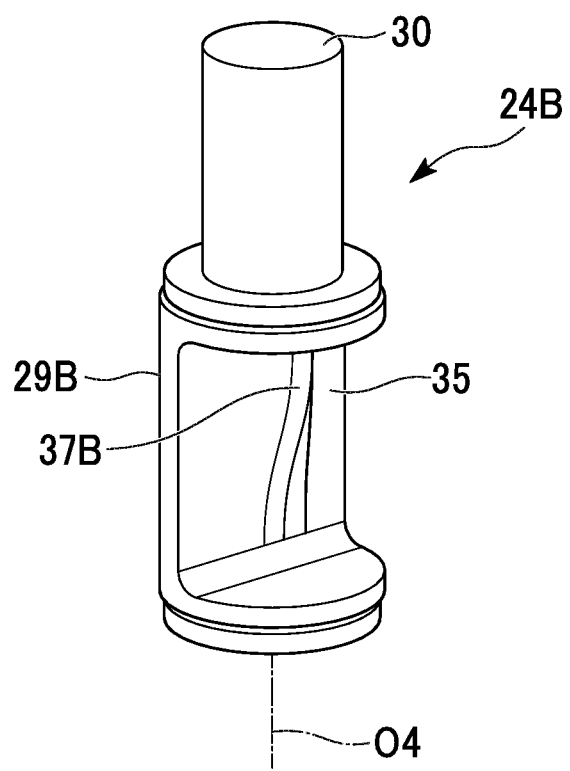
FIG. 23 is a perspective view showing a supercharger having a second modification example of the valve member of the supercharger according to the first embodiment.

FIG. 23 is a perspective view showing a waste gate valve 24B that is a second modification example of the waste gate valve 24 of the supercharger 1 according to the first embodiment.

As shown in FIG. 23, in the waste gate valve 24B, a guide protrusion 37B is formed on a valve body 29B. The waste gate valve 24B is different from the waste gate valve 24A shown in FIG. 22 in that the protruding height of the guide protrusion 37B gradually decreases in one direction along the axis O4.

The waste gate valve 24B can adjust the effect of arranging the flow of exhaust gas in accordance with the shape of the guide protrusion 37B.

Figure 24:
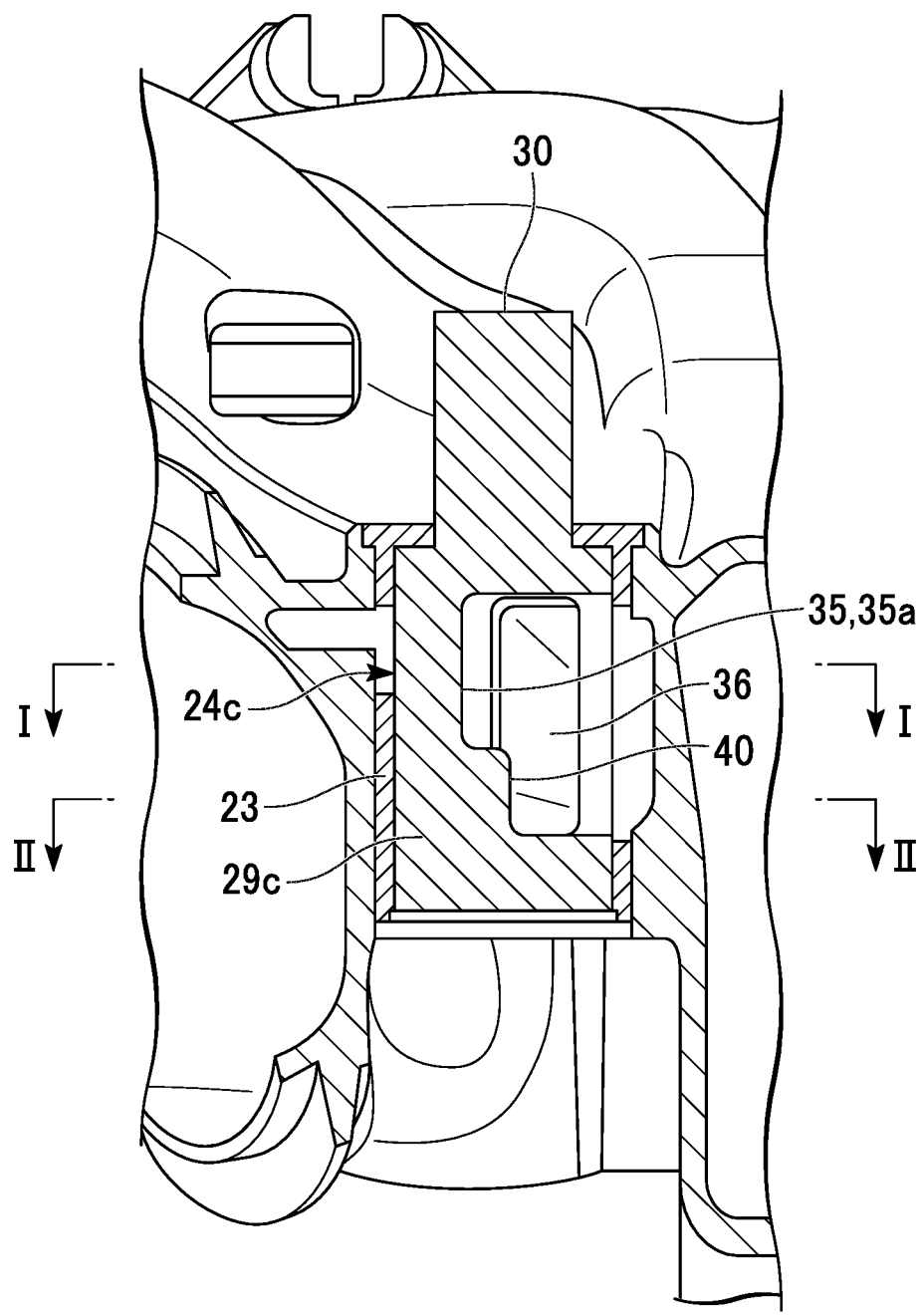
FIG. 24 is a sectional view showing a supercharger having a third modification example of the valve member of the supercharger according to the first embodiment.
Figure 25:
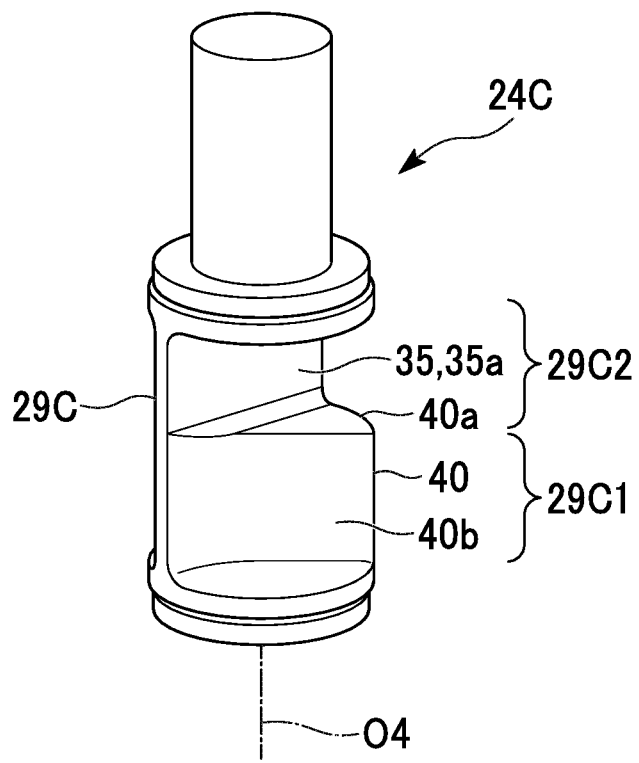
FIG. 25 is a perspective view showing the valve member of the preceding figure.
Figure 26:
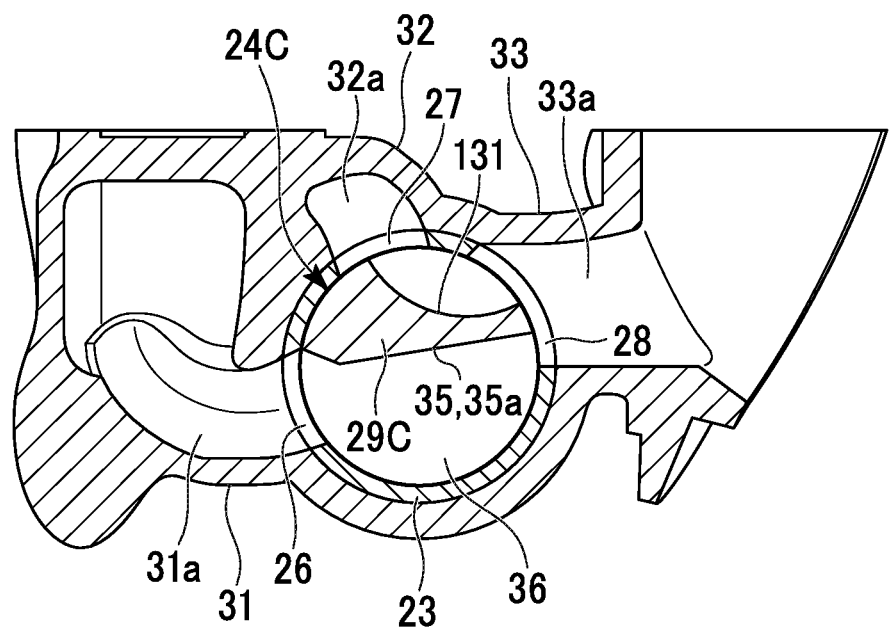
FIG. 26 is a sectional view showing the supercharger of FIG. 24.
Figure 27:
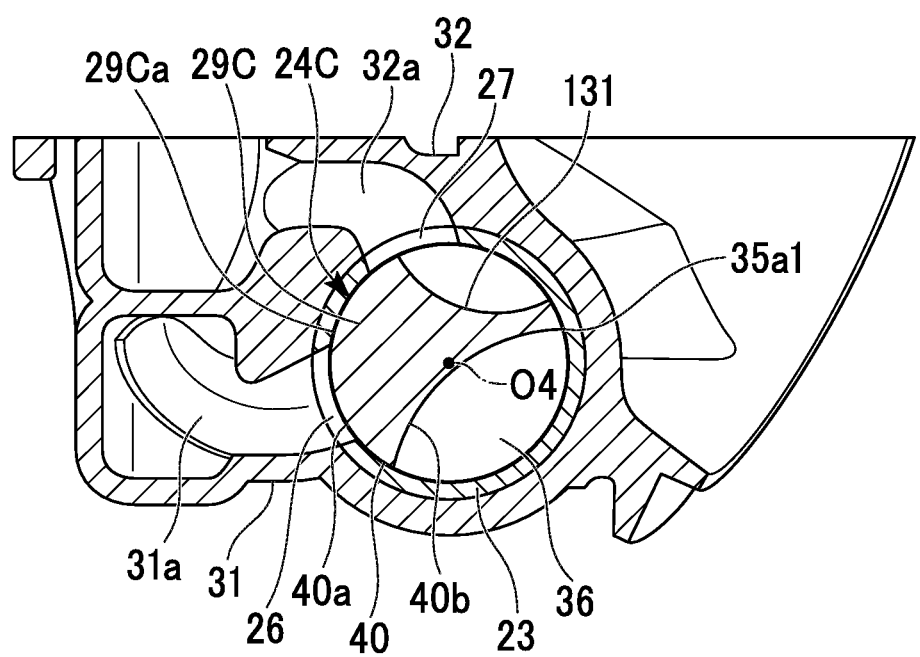
FIG. 27 is a sectional view showing the supercharger of FIG. 24.

FIG. 24 is a sectional view showing a supercharger having a waste gate valve 24C that is a third modification example of the waste gate valve 24 of the supercharger 1 according to the first embodiment. FIG. 25 is a perspective view showing a waste gate valve 24C. FIG. 26 is a sectional view showing a supercharger having the waste gate valve 24C, and is an I-I sectional view of FIG. 24. FIG. 27 is a sectional view showing a supercharger having the waste gate valve 24C, and is an II-II sectional view of FIG. 24.

As shown in FIGS. 24 and 25, the waste gate valve 24C is different from the waste gate valve 24 shown in FIGS. 7 and 8 in that an adjustment protrusion 40 is formed on the main surface 35a of a valve body 29C. The adjustment protrusion 40 is formed in a region including a portion in a length direction (a direction along the axis O4), specifically, one end part in a direction along the axis O4, in the main surface 35a.

As shown in FIG. 27, a section of the adjustment protrusion 40 orthogonal to the axis O4 has a shape having a circular-arc outer peripheral surface 40a and a curvedly recessed inner surface 40b. The outer peripheral surface 40a is a columnar surface having the axis O4 as a central axis, and is continuously formed from an outer peripheral surface 29Ca of the valve body 29C. The inner surface 40b has a shape of which the height is gradually increased from one side edge 35a1 of the main surface 35a toward the other side edge thereof. The inner surface 40b is a surface in which a section orthogonal to the axis O4 is curvedly recessed. The sectional shape of the inner surface 40b is, for example, a circular arc shape, an elliptical arc shape, or the like.

As shown in FIG. 25, in the valve body 29C of the waste gate valve 24C, a portion in which the adjustment protrusion 40 is formed is referred to as a first portion 29C1, and a portion in which the adjustment protrusion 40 is not formed is referred to as a second portion 29C2.

As shown in FIG. 26, the waste gate valve 24C can take a position where, in the second portion 29C2, the first introduction port 26 communicate with the outlet port 28 via the main circulation space 36 and the second introduction port 27 communicates with the outlet port 28 via the subsidiary circulation space 131. In this case, as shown in FIG. 27, in the first portion 29C1 of the waste gate valve 24C, the outer peripheral surface 40a of the adjustment protrusion 40 covers a portion of the first introduction port 26. For that reason, the inflow rate of the gas from the first introduction port 26 to the chamber 23 (main circulation space 36) can be adjusted.

The waste gate valve 24C can adjust the inflow rate of the gas from the second introduction port 27 to the chamber 23 (main circulation space 36) if the waste gate valve 24C is disposed at a position where the outer peripheral surface 40a of the adjustment protrusion 40 covers a portion of the second introduction port 27.

In addition, the adjustment protrusion can also be formed so as to be capable of covering portions of both the first introduction port and the second introduction port. According to this configuration, the inflow rate of the gas from the first introduction port and the second introduction port to the chamber can be adjusted.

Fourth Embodiment

Figure 28:
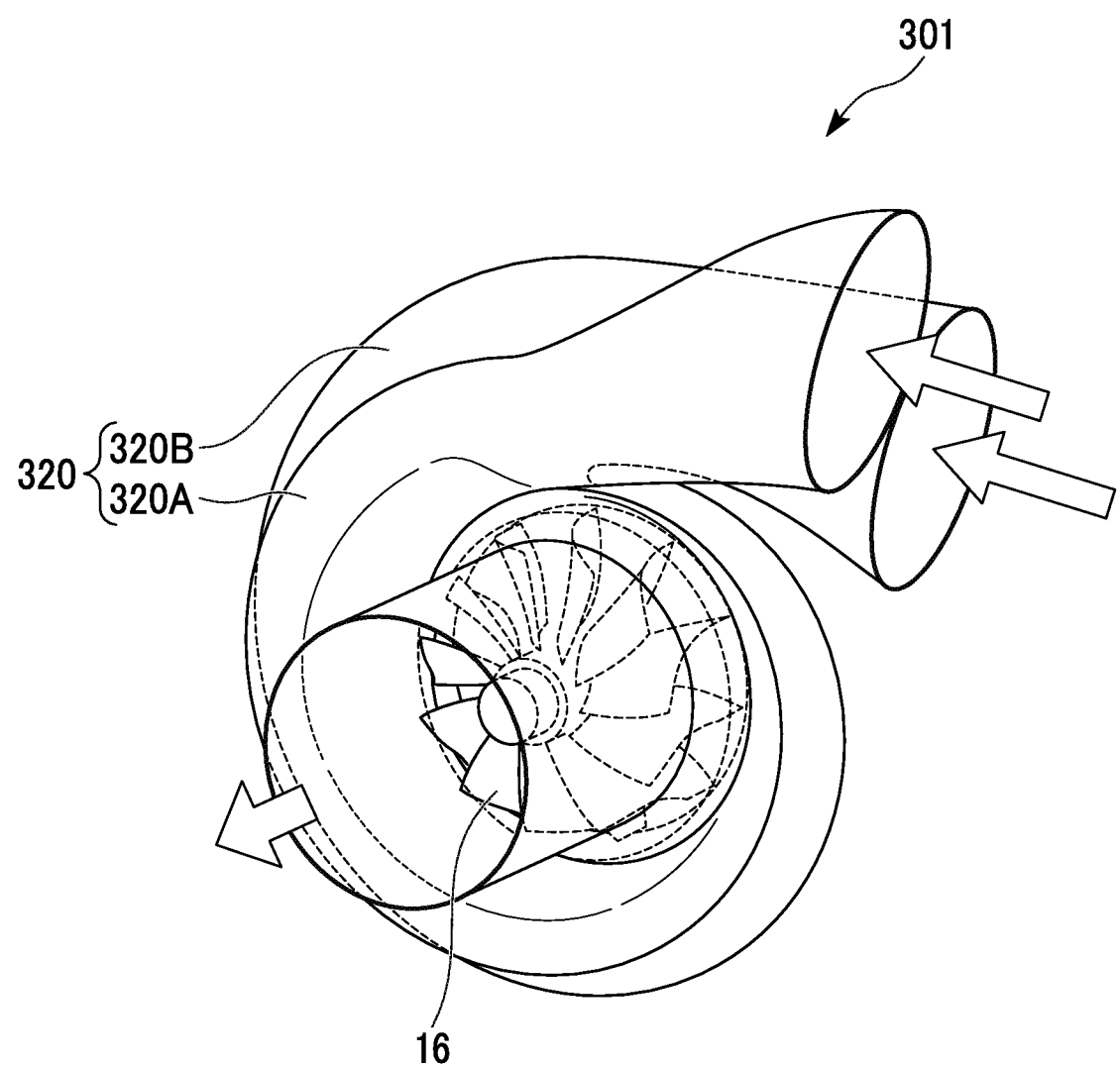
FIG. 28 is a perspective view showing a schematic configuration of a portion of a supercharger according to a fourth embodiment.

FIG. 28 is a perspective view showing a schematic configuration of a portion of a supercharger 301 according to a fourth embodiment.

An exhaust gas introduction part 320 of the supercharger 301 has a first exhaust gas introduction part 320A that is spirally formed and a second exhaust gas introduction part 320B that is spirally formed. The first exhaust gas introduction part 320A and the second exhaust gas introduction part 320B are provided side by side in an axial direction (an axial direction of the turbine wheel 16).

The supercharger 301 is a supercharger having a structure in which the two spiral exhaust gas introduction parts 320A and 320B are provided side by side in the axial direction, what is so called, a "twin scroll" type structure.

The supercharger 301 can be provided with the waste gate mechanism 5 (refer to FIG. 1), similar to the supercharger 1 (refer to FIG. 2). In the waste gate mechanism 5, for example, the first introduction part 31 (refer to FIG. 4) is connected to the first exhaust gas introduction part 320A, and the second introduction part 32 (refer to FIG. 4) is connected to the second exhaust gas introduction part 320B.

Figure 29:
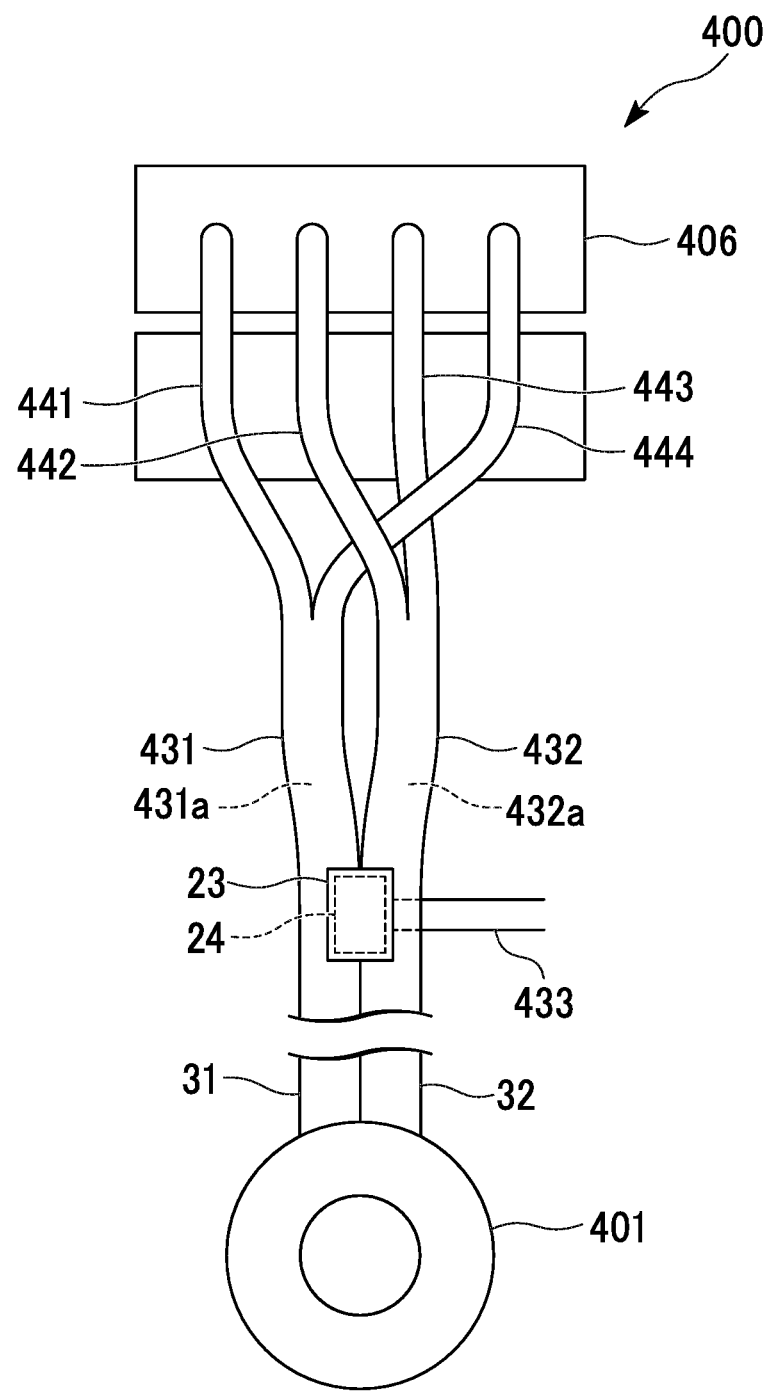
FIG. 29 is a view showing a schematic configuration of a portion of an internal combustion engine according to an embodiment.

FIG. 29 is a view showing a schematic configuration of a portion of an internal combustion engine 400 according to the embodiment.

As shown in FIG. 29, the internal combustion engine 400 includes an engine 406, a first introduction part 431, a second introduction part 432, the chamber 23, a valve 24 (valve member), a waste gate outlet part 433, and a supercharger 401.

The first introduction part 431 forms a first flow channel 431a. A first introduction pipeline 441 and a fourth introduction pipeline 444 are connected to the first introduction part 431. A first cylinder (not shown) among four cylinders of the engine 406 is connected to the first introduction pipeline 441, and a fourth cylinder (not shown) is connected to the fourth introduction pipeline 444.

The second introduction part 432 forms a second flow channel 432a. A second introduction pipeline 442 and a third introduction pipeline 443 are connected to the second introduction part 432. A second cylinder (not shown) among the four cylinders of the engine 406 is connected to the second introduction pipeline 442, and a third cylinder (not shown) is connected to the third introduction pipeline 443.

The waste gate outlet part 433 forms an outlet flow channel 433a.

The internal combustion engine 400 can discharge the exhaust gas, which is directed through the first flow channel 431a and the second flow channel 432a from the engine 406, to the system exterior through the chamber 23 and the outlet flow channel 433a.

In the internal combustion engine 400, the flow of the exhaust gas can be adjusted by disposing the valve 24 to any among the first position P1 (to refer to FIG. 8), the second position P2 (to refer to FIG. 9), and the third position P3 (to refer to FIG. 10).

Although the invention has been described above in detail, the invention is not limited to the above-described embodiments, and various changes can be added without departing from the scope of the invention.

For example, the supercharger 1 shown in FIG. 4 and the like has two introduction parts (the first introduction part 31 and the second introduction part 32). However, in the superchargers of the embodiments, the number of introduction parts may be two or more arbitrary numbers.

In the supercharger 101 shown in FIG. 12, the first introduction port 26 is capable of communicating with the outlet port 28 via the main circulation space 36, and the second introduction port 27 is capable of communicating the outlet port 28 via the subsidiary circulation space 131. In the superchargers of the embodiment, conversely, the first introduction port is capable of communicating with the outlet port via the subsidiary circulation space 131, and the second introduction port is capable of communicating with the outlet port via the main circulation space.

The valve member can be configured to be capable of opening and closing the first introduction port.

The valve member can allow two or more arbitrary ports among the first introduction port, the second introduction port, and the outlet port to communicate with each other through the main circulation space. For example, the first introduction port and the outlet port among three ports (the first introduction port, the second introduction port, and the outlet port) may be allowed to communicate with each other, or the second introduction port and the outlet port may be allowed to communicate with each other.

REFERENCE SIGNS LIST 1, 101, 201, 301: SUPERCHARGER
16: TURBINE WHEEL (TURBINE)
20a1: FIRST EXHAUST GAS INTRODUCTION PASSAGE
20a2: SECOND EXHAUST GAS INTRODUCTION PASSAGE
23: CHAMBER 23a: INNER PERIPHERAL SURFACE
24, 24A TO 24C: WASTE GATE VALVE (VALVE MEMBER)
26: FIRST INTRODUCTION PORT
27: SECOND INTRODUCTION PORT
28: OUTLET PORT
28A: FIRST OUTLET PORT
28B: SECOND OUTLET PORT
29a, 129a: OUTER PERIPHERAL SURFACE
31: FIRST INTRODUCTION PART
31a: FIRST FLOW CHANNEL
32: SECOND INTRODUCTION PART
32a: SECOND FLOW CHANNEL
33: WASTE GATE OUTLET PART (OUTLET PART)
33a: OUTLET FLOW CHANNEL
35a: MAIN SURFACE
36: MAIN CIRCULATION SPACE
130: CUTOUT
131: SUBSIDIARY CIRCULATION SPACE
133A: FIRST WASTE GATE OUTLET PART (OUTLET PART)
133Aa: FIRST OUTLET FLOW CHANNEL
133B: SECOND WASTE GATE OUTLET PART (OUTLET PART)
133Ba: SECOND OUTLET FLOW CHANNEL
400: INTERNAL COMBUSTION ENGINE

What is claimed is:

1. A supercharger comprising:
a first introduction part having a first flow channel that is configured to direct exhaust gas away from a first exhaust gas introduction passage that leads to a turbine driven by the exhaust gas;
a second introduction part having a second flow channel that is configured to direct the exhaust gas away from a second exhaust gas introduction passage that leads to the turbine;
a chamber into which the exhaust gas is introduced through the first flow channel and the second flow channel;
an outlet part having one or a plurality of outlet flow channels that is configured to direct the exhaust gas within the chamber to a system exterior; and
a valve member housed in the chamber,
wherein the chamber has a first introduction port that leads to the first flow channel, a second introduction port that leads to the second flow channel, and one or a plurality of outlet ports that lead to the outlet flow channel,
wherein a main circulation space that allows gas to circulate thereinto is secured on a main surface side of the valve member within the chamber,
wherein the valve member is rotatable about an axis, is capable of opening or closing the first introduction port, the second introduction port, and the outlet port in accordance with a rotational position around the axis, and allows two or more opened ports among the first introduction port, the second introduction port, and the outlet port to communicate with each other through the main circulation space,
wherein a cutout, which forms a subsidiary circulation space that allows gas to circulate thereinto, is formed in a back surface of the valve member opposite to the main surface, and
wherein the valve member allows any one of the first and second introduction ports and the outlet port to communicate with each other through the main circulation space, and allows the other of the first and second introduction ports and the outlet port to communicate with each other through the subsidiary circulation space.

2. The supercharger according to claim 1,
wherein the valve member allows the first introduction port, and the second introduction port to communicate with each other through the main circulation space.

3. The supercharger according to claim 1,
wherein the valve member allows the first and second introduction ports and the outlet port to communicate with each other through the main circulation space.

4. The supercharger according to claim 1,
wherein the chamber has an inner peripheral surface that is a cylindrical surface having the axis as a central axis, and
wherein the valve member has an outer peripheral surface, which is a columnar surface having the axis a central axis, as the back surface.

5. The supercharger according to claim 1,
wherein the plurality of outlet ports include a first outlet port and a second outlet port, and
wherein the valve member allows any one of the first and second introduction ports and the first outlet port to communicate with each other through the main circulation spaces, and allows the other of the first and second introduction ports and the second outlet port to communicate with each other through the subsidiary circulation space.

6. The supercharger according to claim 1,
wherein a guide protrusion, which is configured to adjust a flow resistance of gas flowing into the outlet port from at least one of the first and second introduction ports, is formed on the main surface of the valve member.

7. The supercharger according to claim 1,
wherein an adjustment protrusion, which covers a portion of at least any one of the first and second introduction ports to adjust a flow rate of the gas from the port, is formed on the main surface of the valve member.

8. An internal combustion engine comprising:
a first introduction part having a first flow channel for directing exhaust gas away from a turbine;
a second introduction part having a second flow channel that is configured to direct the exhaust gas away from the turbine;
a chamber into which the exhaust gas is introduced through the first flow channel and the second flow channel;
an outlet part having one or a plurality of outlet flow channels that are configured to direct the exhaust gas within the chamber to a system exterior; and
a valve member housed in the chamber,
wherein the chamber has a first introduction port that leads to the first flow channel, a second introduction port that leads to the second flow channel, and one or a plurality of outlet ports that lead to the outlet flow channel,
wherein a main circulation space that allows gas to circulate thereinto is secured on a main surface side of the valve member within the chamber,
wherein the valve member is rotatable about an axis, is capable of opening or closing the first introduction port, the second introduction port, and the outlet port in accordance with a rotational position around the axis, and allows two or more opened ports among the first introduction port, the second introduction port, and the outlet port to communicate with each other through the main circulation space,
wherein a cutout, which forms a subsidiary circulation space that allows gas to circulate thereinto, is formed in a back surface of the valve member opposite to the main surface, and
wherein the valve member allows any one of the first and second introduction ports and the outlet port to communicate with each other through the main circulation space, and allows the other of the first and second introduction ports and the outlet port to communicate with each other through the subsidiary circulation space.

* * * * *